(12) United States Patent
Hirota et al.

(10) Patent No.: US 6,268,960 B1
(45) Date of Patent: Jul. 31, 2001

(54) SYSTEM FOR ENLARGEDLY OBSERVING AN IMAGE, AND FILTER ASSEMBLY FOR USE IN THE SYSTEM

(75) Inventors: Kashichi Hirota; Junji Fukuda, both of Hachioji (JP)

(73) Assignee: Kyowa Electric & Chemical Ltd., Tokyo (JP)

( * ) Notice: Subject to any disclaimer, the term of this patent is extended or adjusted under 35 U.S.C. 154(b) by 0 days.

(21) Appl. No.: 09/165,691

(22) Filed: Oct. 2, 1998

(30) Foreign Application Priority Data

Oct. 15, 1997 (JP) .................................................. 9-281636
Dec. 24, 1997 (JP) .................................................. 9-354650
Apr. 8, 1998 (JP) .................................................. 10-95776

(51) Int. Cl.$^7$ .............................. G03B 21/56; H04N 5/72
(52) U.S. Cl. ........................................... 359/460; 348/832
(58) Field of Search .................................... 359/443, 460, 359/456, 457; 348/832, 833, 834, 835

(56) References Cited

U.S. PATENT DOCUMENTS

| | | | | |
|---|---|---|---|---|
| 3,842,202 | * | 10/1974 | Coale ................................... | 178/7.85 |
| 4,575,767 | * | 3/1986 | Cohen et al. ......................... | 358/250 |
| 4,695,135 | * | 9/1987 | Den Exter Blokland et al. .. | 350/452 |
| 4,804,253 | * | 2/1989 | Stewart ................................ | 350/330 |
| 5,052,807 | * | 10/1991 | Juday ................................... | 356/375 |

* cited by examiner

Primary Examiner—Christopher E. Mahoney
(74) Attorney, Agent, or Firm—Frishauf, Holtz, Goodman, Langer & Chick, P.C.

(57) ABSTRACT

A system which enables to observe an image without any trouble by suppressing an occurrence of the Moiré interference fringes, when implementing an enlarging observation of an image using a thin lens with respect to an image display screen having a plurality of pixels arranged two-dimensionally with a periodicity, such as the CRT display or the liquid crystal display is provided. The system for enlargedly observing an image on an image screen having a plurality of pixels arranged two-dimensionally with a periodicity, said system includes a thin transparent lens means configured to enlargedly and transparently observe an image, and arranged with a plurality of image enlarging optical elements in two-dimensions having a periodicity by a predetermined pitch. The lens means has an overall magnifying power in the range of 1.01~1.20, and is placed on an observer side apart from the image screen with a predetermined gap. The predetermined gap between the lens means and the image screen is in the range of 2 mm~40 mm, and the pitch of the plurality of image enlarging optical elements formed in the lens means is in the range of 0.023 mm~0.25 mm. The predetermined gap between the lens means and the image screen is defined in association with the pitch of the optical elements of the lens means such that an intensity of Moiré interference fringes caused by a periodicity of an arrangement of the pixels in the image screen and a periodicity of an arrangement of the optical elements of the lens means must not exceed 0.15 in an absolute value.

39 Claims, 24 Drawing Sheets

|   | P=0.023 | P=0.03 | P=0.04 | P=0.05 | P=0.075 | P=0.1 |
|---|---|---|---|---|---|---|
| L=2 | 0.510 | 0.687 | 0.814 | 0.879 | 0.944 | 0.969 |
| 3 | 0.140 | 0.393 | 0.617 | 0.741 | 0.879 | 0.930 |
| 4 | −0.089 | 0.119 | 0.393 | 0.574 | 0.791 | 0.879 |
| 5 | −0.126 | −0.064 | 0.181 | 0.393 | 0.687 | 0.815 |
| 7.5 | 0.063 | −0.068 | −0.119 | 0.013 | 0.393 | 0.617 |
| 10 | — | 0.064 | −0.068 | −0.065 | 0.119 | 0.393 |

NOTE : UNIT OF PITCH IS MILLIMETER (mm)

FIG. 3A
FIG. 3B
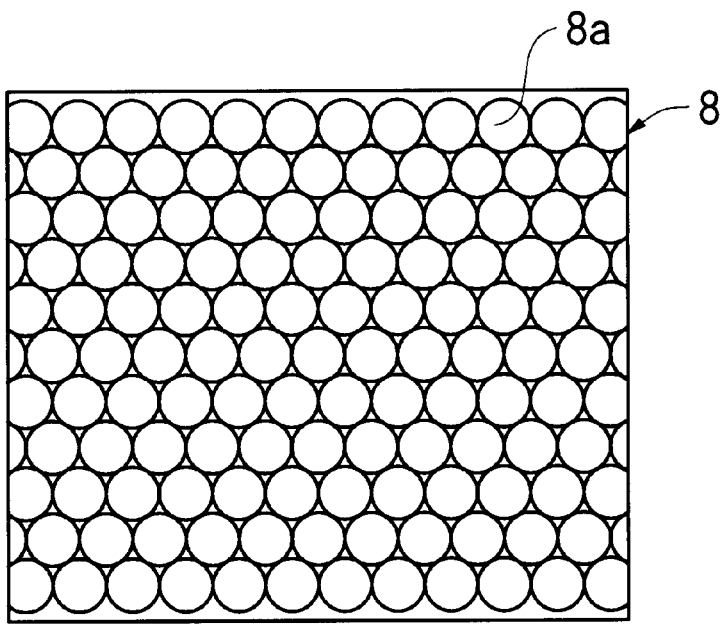
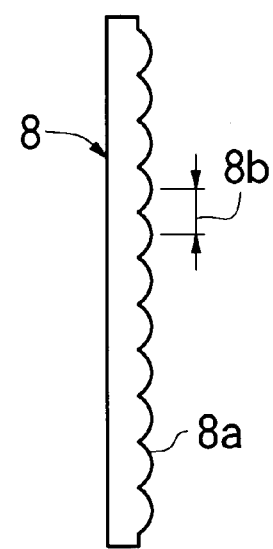

FIG. 4A
FIG. 4B
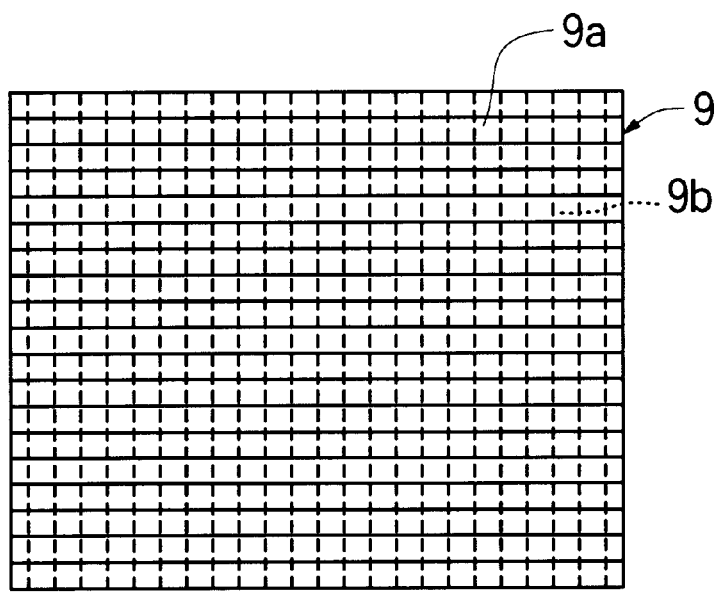
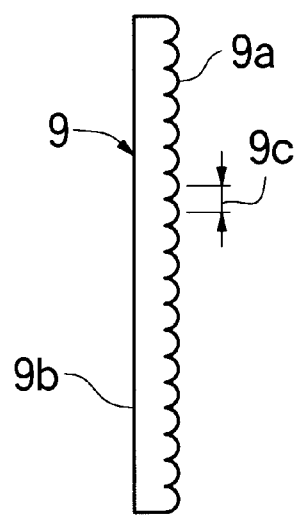
FIG. 4C
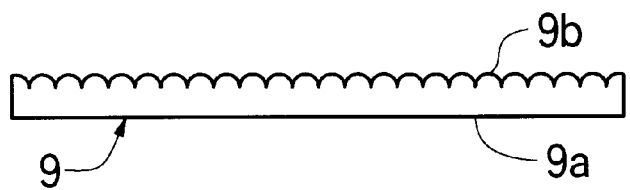

$\theta \leq \sin^{-1}(1/n)$

REFRACTIVE INDEX OF MATERIAL (n)

FIG. 6

| | P=0.023 | P=0.03 | P=0.04 | P=0.05 | P=0.075 | P=0.1 |
|---|---|---|---|---|---|---|
| L=2 | 0.510 | 0.687 | 0.814 | 0.879 | 0.944 | 0.969 |
| 3 | 0.140 | 0.393 | 0.617 | 0.741 | 0.879 | 0.930 |
| 4 | -0.089 | 0.119 | 0.393 | 0.574 | 0.791 | 0.879 |
| 5 | -0.126 | -0.064 | 0.181 | 0.393 | 0.687 | 0.815 |
| 7.5 | 0.063 | -0.068 | -0.119 | 0.013 | 0.393 | 0.617 |
| 10 | — | 0.064 | -0.068 | -0.065 | 0.119 | 0.393 |

NOTE : UNIT OF PITCH IS MILLIMETER (mm)

FIG. 8

| | P=0.065 | P=0.075 | P=0.1 | P=0.15 | P=0.2 | P=0.25 |
|---|---|---|---|---|---|---|
| L=5 | 0.600 | 0.687 | 0.815 | 0.914 | 0.951 | 0.969 |
| 10 | -0.007 | 0.119 | 0.393 | 0.687 | 0.815 | 0.879 |
| 15 | -0.107 | -0.131 | 0.013 | 0.393 | 0.617 | 0.741 |
| 20 | 0.049 | -0.028 | -0.131 | 0.119 | 0.393 | 0.573 |
| 25 | 0.026 | 0.064 | -0.068 | -0.064 | 0.181 | 0.393 |
| 30 | — | 0.010 | 0.038 | -0.131 | 0.013 | 0.222 |
| 35 | — | — | 0.060 | -0.103 | -0.092 | 0.074 |
| 40 | — | — | — | -0.028 | -0.131 | -0.037 |

NOTE: UNIT OF PITCH IS MILLIMETER (mm)

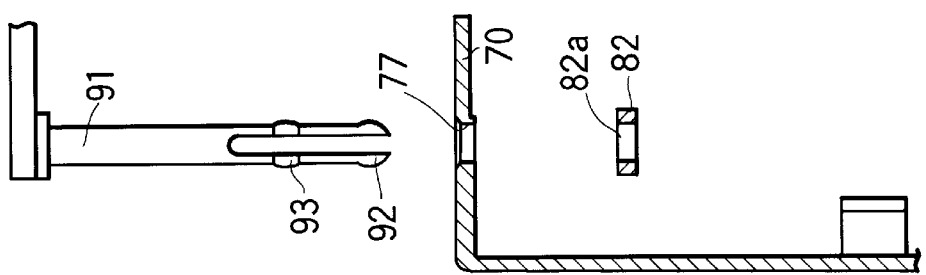
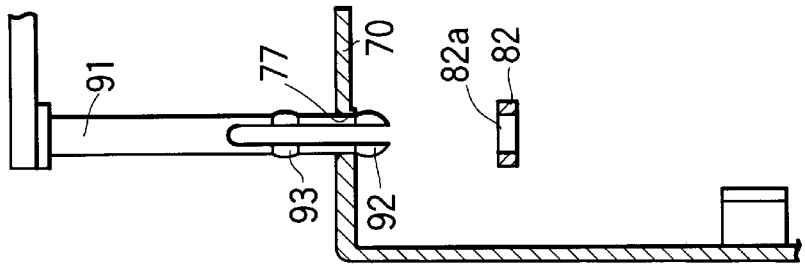
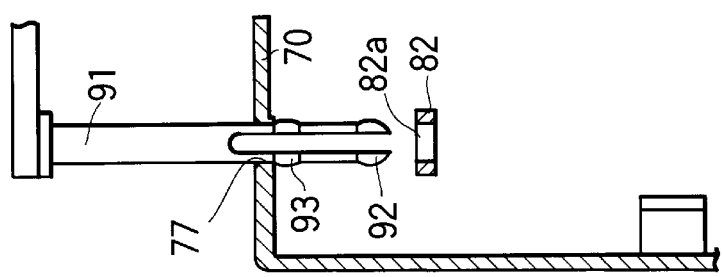
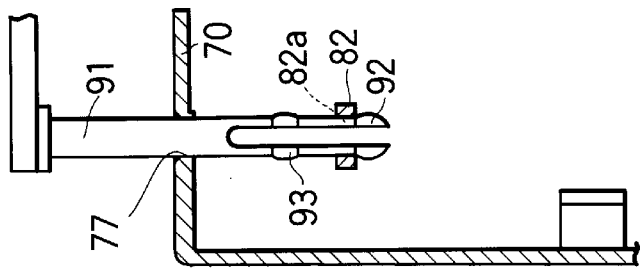
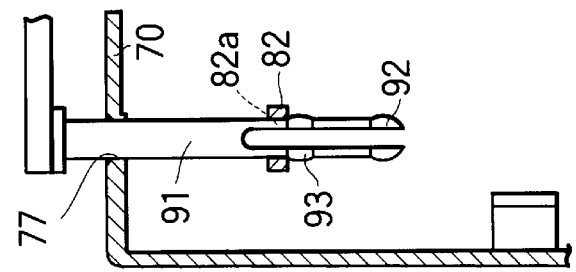

SYSTEM FOR ENLARGEDLY OBSERVING AN IMAGE, AND FILTER ASSEMBLY FOR USE IN THE SYSTEM

BACKGROUND OF THE INVENTION

1. Field of the Invention

The present invention relates to a system for enlargedly observing an image. More particularly, the present invention relates to a system for enlargedly observing an image which is displayed on an image display screen having a plurality of pixels arranged two-dimensionally with a periodicity as a CRT (Cathode Ray Tube) display or a liquid crystal display, using a thin transparent lens that is configured to enlargedly and transparently observe an image of which a plurality of image enlarging optical elements are arranged two-dimensionally with a periodicity by a predetermined pitch. The present invention also relates to a thin lens apparatus for use in such system for enlargedly observing an image. Further, the present invention relates to a filter assembly for arranging a filter in front of a display device.

2. Description of the Related Art

As a thin (low-profile) lens having a function of enlarging an image, a Fresnel lens is well known. The Fresnel lens has a structure of a large number of the prism elements in ring shapes, of which an outer surface thereof forms the parts of the curved surface of the lens, which are arranged concentrically, and can be made much thinner than an ordinal lens.

Similarly, as a thin lens having an image enlarging function, there is a lens beads array of which a large number of small size convex lens elements are arranged two-dimensionally on one plane.

Furthermore, a lenticular lens of which a large number of linear image enlarging optical elements are arranged in parallel is also known, and a thin lens enabling to evenly enlarge the image into both directions of the length-width wise can be formed by putting two lenticular lenses together such that the image enlarging optical elements thereof are intersecting at right angles each other.

The display screen can be enlargedly observed by placing the thin lens of the type described above in front of an image display device of an image display apparatus such as a CRT display or a liquid crystal display.

However, since the image display apparatus such as the CRT display or the liquid crystal display is that, on the screen thereof, a plurality of pixels are arranged two-dimensionally with a periodicity, and also in the thin lens described above the image enlarging optical elements are arranged two-dimensionally with a periodicity, when observing the screen of the image display apparatus of this kind through the thin lens described above, a clear image can not be obtained because of the Moire interference fringes being resulted from a diffraction phenomena, thereby causing a trouble in the image observation.

In convention, it is well known to place a filter in front of the display device comprising the CRT display or the liquid crystal display in order to ease the eyestrain caused by watching the display screen intensely.

A surface of the filter eases of the eyestrain and implements an easy-to-see screen by making a reflection prevent treatment of a hard-coat by the existence technique thereon, and further adding an anti-glare treatment, and a coloring treatment and the like thereto.

A conventional filter to be used for this purpose has a structure of which a filter is engaged in a frame formed by a metal wile or a plastic material, and is configured such that the filter is placed in front of the display screen by hanging the frame of which the filter is engaged in on the display device.

The inventors of the present invention have been proposed to place a Fresnel lens in front of the display screen in the display device of this kind, as in the Japanese Patent Application No. 9-3607. Herein, the purpose of using the Fresnel lens is to enhance a resolving power of the display by the CRT, and to facilitate to see a screen with an diffusion effect by the Fresnel lens. In this case, in order to achieve a required effect, it is desirable that an optical center of the lens is to be located around a center of the display screen, in a view point of the optical characteristics of the lens.

However, in the conventional filter assembly designed for the display device, a positioning precision of the filter is not sufficient, and also it was not easy to make a positioning adjustment. Accordingly, when using the Fresnel lens as a filter of the filer assembly, there was a problem that a performance of the Fresnel lens can not be demonstrated sufficiently.

Further, although it is desirable to enable to adjust a position of the filter in accordance with the designed dimensions of the frame in the display device when using a conventional filter without using the Fresnel lens, the conventional filter assembly can not comply with such a demand.

SUMMARY OF THE INVENTION

Accordingly, it is an object of the present invention is to provide a system which enables to observe an image without any trouble by suppressing an occurrence of the moiré interference fringes, when implementing an enlarging observation of an image using a thin lens with respect to an image display screen having a plurality of pixels arranged two-dimensionally with a periodicity, such as the CRT display or the liquid crystal display.

It is another object of the present invention is to provide a filter assembly which can be easily installed in front of a screen of a plane type.

Further, it is another object to provide a filter assembly which enables to easily implement a positioning adjustment of the filter in both directions of the length-height wise.

The above mentioned object of the present can be achieved by a system for enlargedly observing an image on an image screen having a plurality of pixels arranged two-dimensionally with a periodicity, comprises:

a thin transparent lens means configured to enlargedly and transparently observe an image, and arranged with a plurality of image enlarging optical elements in two-dimensions having a periodicity by a predetermined pitch, wherein the lens means has an overall magnifying power in the range of 1.01~1.20, and is placed on an observer side apart from the image screen with a predetermined gap, the predetermined gap between the lens means and the image screen is in the range of 2 mm~40 mm, the pitch of the plurality of image enlarging optical elements formed in the lens means is in the range of 0.023 mm~0.25 mm, and the predetermined gap between the lens means and the image screen is defined in association with the pitch of the optical elements of the lens means such that an intensity of Moiré interference fringes caused by a periodicity of an arrangement of the pixels in the image screen and a periodicity of an arrangement of the optical elements of the lens means must not exceed 0.15 in an absolute value.

Preferably, the predetermined gap between the lens means and the image screen is in the range of 35 mm~40 mm.

The above-mentioned object of the present invention can be achieved by a system for enlargedly observing an image on an image screen having a plurality of pixels arranged two-dimensionally with a periodicity, comprising:

a thin transparent lens means configured to enlargedly and transparently observe an image, and arranged with a plurality of image enlarging optical elements in two-dimensions having a periodicity by a predetermined pitch, wherein the lens means has an overall magnifying power in the range of 1.01~1.20, and is placed on an observer side apart from the image screen with a predetermined gap, the predetermined gap between the lens means and the image screen is less than 40 mm, the pitch of the plurality of image enlarging optical elements formed in the lens means is in the range of 0.065 mm~0.25 mm, and the predetermined gap between the lens means and the image screen is defined in association with the pitch of the optical elements of the lens means such that an intensity of Moiré interference fringes caused by a periodicity of an arrangement of the pixels in the image screen and a periodicity of an arrangement of the optical elements of the lens means must not exceed 0.15 in an absolute value.

Preferably, the predetermined gap between the lens means and the image screen is in the range of 35 mm~40 mm.

The above-mentioned object can be achieved by a system for enlargedly observing an image on an image screen having a plurality of pixels arranged two-dimensionally with a periodicity, comprises:

a thin transparent lens means configured to enlargedly and transparently observe an image, and arranged with a plurality of image enlarging optical elements in two-dimensions having a periodicity by a predetermined pitch, wherein the lens means has an overall magnifying power in the range of 1.01~1.20, and is placed on an observer side apart from the image screen with a predetermined gap, the predetermined gap between the lens means and the image screen is in the range of 30 mm~40 mm, the pitch of the plurality of image enlarging optical elements formed in the lens means is in the range of 0.065 mm 0.20 mm, thereby an intensity of Moiré interference fringes caused by a periodicity of an arrangement of the pixels in the image screen and a periodicity of an arrangement of the optical elements of the lens means is decreased to a degree that is not hindrance on an image observation.

Also, the above-mentioned object of the present invention can be achieved by a system for enlargedly observing an image on an image screen having a plurality of pixels arranged two-dimensionally with a periodicity, comprises:

a thin transparent lens means configured to enlargedly and transparently observe an image, and arranged with a plurality of image enlarging optical elements in two-dimensions having a periodicity by a predetermined pitch, wherein the lens means has an overall magnifying power in the range of 1.01~1.20, and is placed on an observer side apart from the image screen with a predetermined gap, the predetermined gap between the lens means and the image screen is in the range of 20 mm~40 mm, the pitch of the plurality of image enlarging optical elements formed in the lens means is in the range of 0.065 mm~0.15 mm, thereby an intensity of Moiré interference fringes caused by a periodicity of an arrangement of the pixels in the image screen and a periodicity of an arrangement of the optical elements of the lens means is decreased to a degree that is not hindrance on an image observation.

Moreover, the object of the present invention as mentioned above can by achieved by a system for enlargedly observing an image on an image screen having a plurality of pixels arranged two-dimensionally with a periodicity, comprises:

a thin transparent lens means configured to enlargedly and transparently observe an image, and arranged with a plurality of image enlarging optical elements in two-dimensions having a periodicity by a predetermined pitch, wherein the lens means has an overall magnifying power in the range of 1.01~1.20, and is placed on an observer side apart from the image screen with a predetermined gap, the predetermined gap between the lens means and the image screen is in the range of 15 mm~40 mm, the pitch of the plurality of image enlarging optical elements formed in the lens means is in the range of 0.065 mm~0.10 mm, thereby an intensity of Moiré interference fringes caused by a periodicity of an arrangement of the pixels in the image screen and a periodicity of an arrangement of the optical elements of the lens means is decreased to a degree that is not hindrance on an image observation.

Furthermore, the object of the present invention described above can be achieved by a system for enlargedly observing an image on an image screen having a plurality of pixels arranged two-dimensionally with a periodicity, comprises:

a thin transparent lens means configured to enlargedly and transparently observe an image, and arranged with a plurality of image enlarging optical elements in two-dimensions having a periodicity by a predetermined pitch, wherein the lens means has an overall magnifying power in the range of 1.01~1.20, and is placed on an observer side apart from the image screen with a predetermined gap, the predetermined gap between the lens means and the image screen is in the range of 10 mm~40 mm, the pitch of the plurality of image enlarging optical elements formed in the lens means is in the range of 0.065 mm~0.075 mm, thereby an intensity of Moiré interference fringes caused by a periodicity of an arrangement of the pixels in the image screen and a periodicity of an arrangement of the optical elements of the lens means is decreased to a degree that is not hindrance on an image observation.

The another object of the present invention described above can be achieved by a thin lens device for use in a system for enlargedly observing an image comprises:

a lens configured to enlargedly and transparently observe an image, and arranged with a plurality of image enlarging optical elements in two-dimensions having a periodicity by a predetermined pitch, with an overall magnifying power in the range of 1.01~1.20; and a frame for supporting the lens, wherein, the frame is provided with a locating means for locating the lens on an observer side relative to an image screen with a predetermined gap, the predetermined gap between the lens and the image screen is defined in association with the pitch of the optical elements of the lens means such that an intensity of Moiré interference fringes caused by a periodicity of an arrangement of the pixels in the image screen and a periodicity of an arrangement of the optical elements of the lens means must not exceed 0.15 in an absolute value.

Yet another object of the present invention can be achieved by a system for enlargedly observing an image on an image screen having a plurality of pixels arranged two-dimensionally with a periodicity, comprises:

a thin transparent lens means configured to enlargedly and transparently observe an image, and arranged with a plurality of image enlarging optical elements in two-dimensions having a periodicity by a predetermined pitch on a first side on an observer side relative to the image screen and on a second side that is an opposite side of the observer side, respectively, the first side being located apart from the image screen with a predetermined gap, wherein the lens means is such that a first plurality of image enlarging optical elements located on the first side and a second plurality of image enlarging optical elements located on the second side are arranged perpendicularly to each other with respect to a central axis which is common to both of the first and the second sides, the predetermined gap between the lens means and the image screen is defined in association with the pitch of the optical elements of the lens means such that an intensity of Moiré interference fringes caused by a periodicity of an arrangement of the pixels in the image screen and a periodicity of an arrangement of the optical elements of the lens means must not exceed 0.15 in an absolute value.

Preferably, the lens means is configured such that a maximum prism angle θ of the minute parts in the optical elements of the lens means satisfies a relationships of $\theta \leq \sin^{-1}(1/n)$ with a refractive index n of a material for the optical elements.

More preferably, the predetermined gap between the lens means and the image screen is in the range of 2 mm~40 mm, and the pitch of the plurality of optical elements is in the range of 0.023 mm~0.25 mm.

Further preferably, the predetermined gap between the lens means and the image screen is in the range of 2 mm~10 mm, and is determined in association with the pitch of the optical elements of the lens means such that an intensity of Moiré interference fringes caused by a periodicity of an arrangement of the pixels in the image screen and a periodicity of an arrangement of the optical elements of the lens means must not exceed 0.15 in an absolute value.

Another object of the present invention can be achieved by a filter assembly for placing a filter in front of a display device, comprises: a lens; and a filter, wherein, the filter assembly is configured such that after having incorporated the filter with the lens, and engaging the lens-incorporated filter with a display frame structure from a side of the image screen of the display device of the display frame structure, the filter and the lens are attached to the display frame structure of the display device, and the display frame structure is placed in front of an image screen of the display device.

Preferably, the lens is a Fresnel lens.

Yet another object of the present invention can be achieved by a filter assembly for placing a filter in front of a display device, comprises:

a lens; and a filter, wherein, the filter assembly is configured such that after having incorporated the filter with the lens, and engaging the lens-incorporated filter with a display frame structure from a side opposite to the image screen of the display device of the display frame structure, the filter and the lens are attached to the display frame structure of the display device, and the display frame structure is placed in front of an image screen of the display device.

The object of the present invention can be achieved by a filter assembly for placing a filter in front of a display device, comprises:

a frame structure made of a plastics material and having an opening for looking at an image by an observer; and a filter supported by the frame structure, wherein, the frame structure is constituted of a front frame and a rear frame which are engaged with each other, and supports the filter by sandwiching it between the front frame and the rear frame, a hole part for latch insertion use having an opening at an edge surface thereof is formed in the frame structure, a latch including a shaft part to be inserted into the hole part for latch insertion use, and a latching member provided at one end of the shaft part and extending from the shaft part in a horizontal direction, is attached to the frame structure by inserting the shaft part into the hole part for latch insertion use, the frame structure is attached to the display device in a state of which the filter is placed in front of the display device by latching the latching member of the latch on an upper surface of the display device, and means for changing a relative height of the frame structure with respect to the display device by adjusting an insertion depth of the shaft part of the latch into the frame structure is provided.

Preferably, the means for changing a relative height of the frame structure with respect to the display device includes a member for stop use in stopping that is provided at a shaft part of the latch, a hole part for use in inserting the latch, which is formed in the frame structure, is configured to extend downwardly from an upper edge part of the frame structure, and includes at least one part for stopping the shaft part, having a diameter smaller than the diameter of the member for stop use, the latch can suspend the frame structure that supports the filter, by inserting the member for stop use into the part for stopping the shaft part in the hole part for use in inserting the latch, thereby enabling a relative position of the filter with respect to the display to be adjusted.

More preferably, the means for changing a relative height of the frame structure with respect to the display device is configured to possess an elasticity in a direction perpendicular to an axial direction, by forming a slit from a free end of the shaft part of the latch toward the axial direction.

Further preferably, the member for stop use is a ring-bead formed on the shaft part in which a slit is formed.

Preferably, the filter is a Fresnel lens,
the display device and the latching member of the latch are fixed with a surface adhesive fastener, and
a distance between the image screen of the display device and the Fresnel lens can be set as desired.

Another object of the present invention can be achieved by a filter assembly for placing a filter in front of a display device, comprises:

a frame structure made of a plastics material and having an opening for looking at an image by an observer; and
a filter supported by the frame structure,
wherein, the frame structure has at least one hole on an upper surface of an upper frame member forming an upper side thereof,
a latch including a shaft part to be inserted into the hole, and a latching member provided at one end of the shaft part and extending from the shaft part in a horizontal direction, is attached to the frame structure by inserting the shaft part into the hole,
the frame structure is attached to the display device in a state of which the filter is placed in front of the display device by latching the latching member of the latch on an upper surface of the display device,
and means for changing a relative height of the frame structure with respect to the display device by adjusting an insertion depth of the shaft part of the latch into the frame structure is provided.

Preferably, the frame structure is constituted of a front board of a quadrangle having a window, an upper frame member, a left frame member, a lower frame member and a right frame member, each of which is coupled to four outer edges of the front board, respectively, wherein, the at least one hole is provided as passing through the upper frame member, and at least one bracket having an aperture at a location apart from the hole with a predetermined gap in a direction of which the shaft part of the latch is inserted into the at least one, may be provided, wherein, the means for changing a relative height of the frame structure with respect to the display device includes at least one member for stop use formed in the shaft part of the latch, having a diameter larger than a diameters of the hole and of the aperture, and being configured to possesses an elasticity in a direction perpendicular to an axial direction, the latch can suspend the frame structure that supports the filter, by inserting at least one the member for stop use into the hole or the aperture, thereby enabling a relative position of the filter with respect to the display to be adjusted.

More preferably, the means for changing a relative height of the frame structure with respect to the display device is configured to possess an elasticity in a direction perpendicular to an axial direction, by forming a slit from a free end of the shaft part of the latch toward the axial direction.

Further preferably, the member for stop use is a ring-bead formed on the shaft part in which a slit is formed.

Preferably, the filter is a Fresnel lens, a positioning surface for positioning by engaging with a front surface of a frame in the display device, being formed at a rear surface of the frame structure, and in a positioning state, the Fresnel lens being placed apart from the front surface of the display device with a predetermined distance.

DESCRIPTION OF THE DRAWINGS

FIG. 3 is constituted of (A) a front view and (B) a side view, showing one example of a lens-beads array that can be used as a filter in the system for enlargedly observing an image of the present invention shown in FIG. 1;

FIG. 4 is constituted of (A) a front view and (B) a side view, and (C) a top view, showing one example of an exchangeable lenticular lens that can be used as a filter in the system for enlargedly observing an image of the present invention shown in FIG. 1;

FIG. 6 is a table of the calculated values showing the influence of a gap between an image forming surface and a lens, as well as of a pitch of an optical element of a lens, on the intensity of Moiré interference fringes;

FIG. 8 is a table of the calculated values showing the influence of a gap between an image forming surface and a lens, as well as of a pitch of an optical element of a lens, on the intensity of Moiré interference fringes;

FIG. 24 is a sectional view showing the states of attaching the latches to the frame structure, and constituted of (A) a view showing a state of which the latches are just to be inserted, and (B), (C), (D), (E) views showing the states of which the latches are further inserted sequentially.

DESCRIPTION OF THE PREFERRED EMBODIMENTS

In the following, the embodiments of the present invention will be described with reference to the accompanying drawings.

Figure 1:
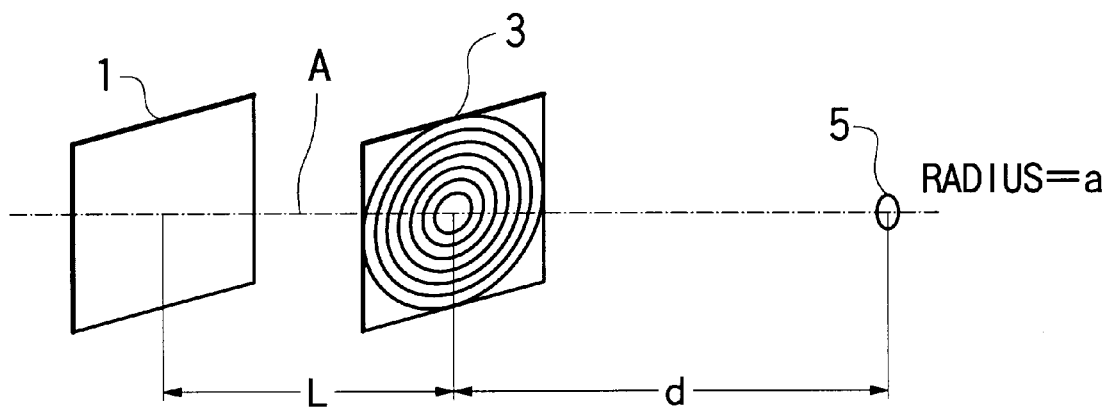
FIG. 1 is a schematic diagram showing an entire system for enlargedly observing an image.

FIG. 1 is a schematic diagram of an optical system showing a principle of the present invention. In FIG. 1, a numeral 1 indicates an image screen, and can be implemented as a cathode ray tube (hereinafter, it refers to as CRI) or a liquid crystal display. A thin lens 3 is placed at a distance L from the image screen 1 along an optical axis A. Further, an eye 5 of an observing system is place at a distance d from the thin lens 3 along the optical axis A. The eye 5 of the observing system may be an eye of an observer. A Fresnel lens, a lens-beads array, or a lenticular lens may be used as the thin lens 3.

Figure 2A:
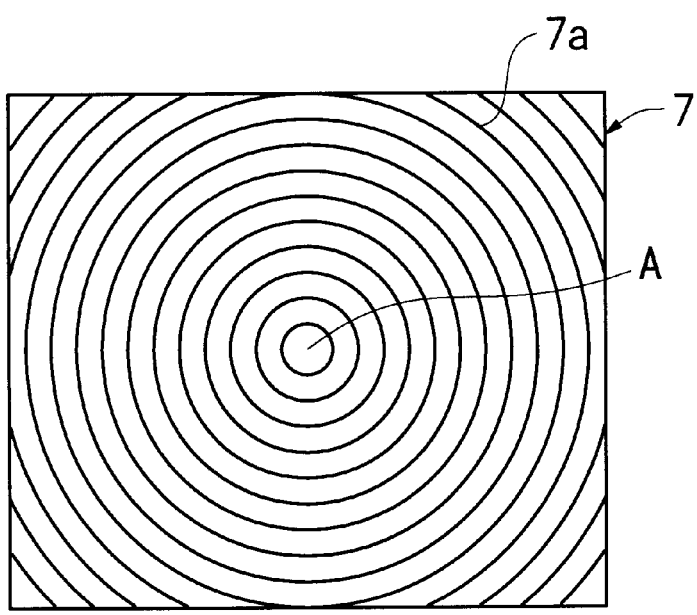
FIG. 2 is constituted of (A) a front view and (B) a side view, showing one example of a Fresnel lens that can be used as a filter in the system for enlargedly observing an image of the present invention shown in FIG. 1.
Figure 2B:
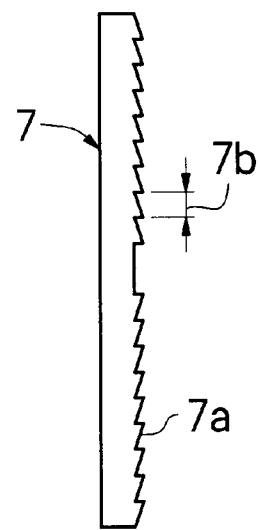

FIGS. 2A and 2B show one example of the Fresnel lens 7 that can be used as the thin lens (lens means) shown in FIG. 1 in the present invention. The Fresnel lens 7 includes multiple lens elements 7a concentrically arranged for the optical axis A. The lens elements 7a constitute the optical elements for enlarging an image (hereinafter, they refer to as the "image enlarging optical elements"), and are formed on a surface of the lens 7 with a regular (constant) pitch 7b.

FIGS. 3A and 3B show one example of the lens-beads array 8 that can be used as the thin lens shown in FIG. 1 in the present invention. The lens-beads array 8 has a configuration of which multiple small spherical lens elements 8a are arranged in the order. In this example, the lines of the spherical lens elements 8a arranged in the rows in a horizontal direction, are arranged alternately in a vertical direction. It may be considered that the pitches of the lens elements 8a in the horizontal direction and the pitches of the lens elements 8a are approximately equal, but herein, it is defined that a central gap 8b of a lens element 8a in the vertical direction is a pitch of the image enlarging optical element.

FIGS. 4A, 4B and 4C show one example of the lenticular lens 9 that can be used as the thin lens in FIG. 1 in the present invention. The lens 9 includes, on one surface thereof, multiple cylindrical lens elements 9a arranged in parallel so as to extend in the right angle direction with respect to the optical axis A, and on the other surface thereof, multiple cylindrical lens elements 9b extending in the right angle direction with respect to the lens elements 9a. The cylindrical lens elements 9a, 9b constitute the image enlarging optical elements, and a central gap 9c of the respective cylindrical elements 9a, 9b is defined as a pitch of the image enlarging optical element.

Each of the lenses described above possesses, for the purpose of the present invention, a magnification of an enlargement of 1.01~1.20 as an overall, respectively.

Figure 5A:
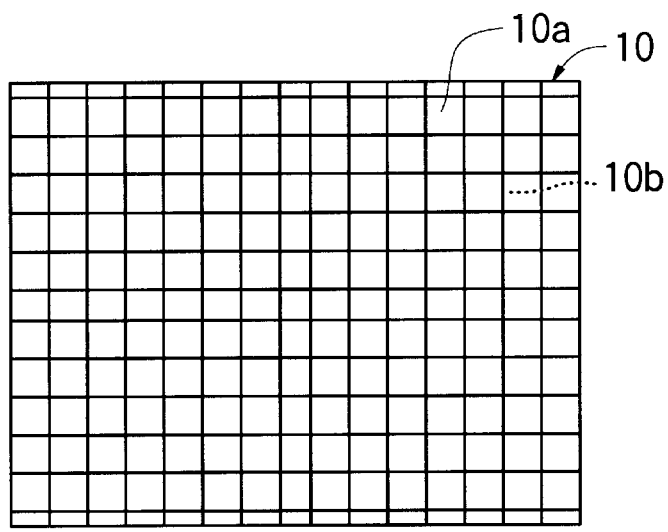
FIG. 5 is constituted of (A) a front view and (B) a side view, (C) a top view, and (D) an enlarged view of the part A shown in (D), showing one example of a filter of which exchangeable cylindrical lenses that can be used as a filter in the system for enlargedly observing an image of the present invention shown in FIG. 1 are configured on both surfaces.
Figure 5B:
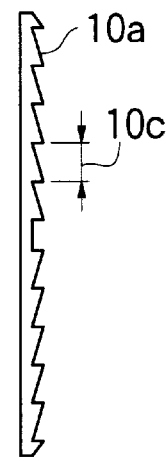
Figure 5C:
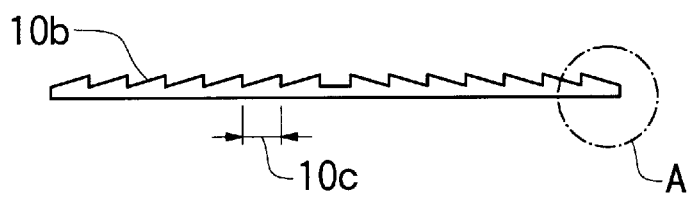
Figure 5D:
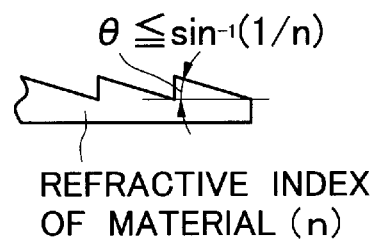

FIGS. 5A, 5B 5C and 5D are schematic diagrams showing a further lens structure that can be used as the thin lens in FIG. 1 in the present invention. As shown in FIG. 5A, in this example, the thin lens minutes the cylindrical lens 10 as the enlarging functional element that accomplishes an enlarging function. As can be seen from FIGS. 5B and 5C, the cylindrical lens 10 includes, by intersecting a generatrix of the cylindrical surface at both surfaces of the thin lens, on one surface thereof, multiple cylindrical lens elements 10a, and on the other surface thereof, multiple cylindrical lens elements 10b that are rotated at 90 degrees with respect to the cylindrical lens elements 10a. As shown in FIGS. 5B and 5C, a width 10c of the respective cylindrical lens element is defined as a pitch of the image enlarging optical element. Further, as shown in FIG. 5D, when the maximum prism angle (θ) of, the minute parts of the enlarging functional elements, i.e., the cylindrical lens elements 10a, 10b in this embodiment, is $$\theta > \sin^{-1}(1/n) \tag{1}$$

in a relation with a refractive index (n) of a material to be used, an angle of a visual field is a narrow at a time of gazing the screen, and the peripheral parts of the screen become visually unclear, thereby a degradation of a visual recognition would occur. Accordingly, it is desirable that the maximum prism angle θ is equal to an angle determined by the relation of $$\theta = \sin^{-1}(1/n) \tag{2}$$

or is equal to or less than that angle, that is, having a relationship of, $$\theta \leq \sin^{-1}(1/n) \tag{3}$$

As shown in this example, by configuring both surfaces of the thin lens with the cylindrical surfaces, a power as the lens becomes stronger, and as a result, it makes possible to increase the magnification of the enlargement. In this example, both surfaces of the thin lens are configured with the cylindrical surfaces, but the same effect will be obtained by configuring both surfaces with the Fresnel lenses if not caring a difficulty of a processing.

These thin lenses shown in FIGS. 2 to 5, can be manufactured by a molding of a transparent plastics material. As required, it is possible to arrange that the thin lens possesses a filter function for penetrating only a light having a desired wavelength. That is, by configuring the thin lens to penetrate only a light with a desired wavelength, the thin lens can be used as a filter.

In the optical system shown in FIG. 1, assuming a radius of an eye of the observing system to be "a", the intensity S of Moiré interference fringes generated by a gap L between the image screen 1 and the lens 3 is expressed in the following equation (4).

$$S = [2J_1(2\pi aL/dp)]/[2\pi aL/dp] \tag{4}$$

herein, $J_1$ is a first Bessel function.

When making a calculation of the intensity of the Moiré interference fringes based on the equation (4), as a=2 mm, d=500 mm, the gap L and pitch p being variables, the results shown in FIG. 6 are obtained.

In FIG. 6, since it is considered that the intensity of the Moiré interference fringes that will not influence the image observation substantially is to be equal to or less than 0.15, it is apparent from the values shown in FIG. 6 that no applicable gap L to an intensity of the Moiré interference fringes equal to or less than 0.15 with the pitch p of 0.1 mm exist, and for the pitch p of 0.075 mm, an applicable gap L is only 10 mm, by obtaining the relationships of the gap L and pitch p of which the intensity of the Moiré interference fringes is within the acceptable range thereof. For the pitch p of 0.04 mm~0.05 mm, the applicable gap L are 7.5 mm~10 mm, and for the pitch p of 0.03 mm, the applicable gap L are 4 mm~10 mm. Also, as apparent from the table 2, for the pitch p of 0.023 mm, the applicable gap L extend from 3 mm to 10 mm.

Figure 7:
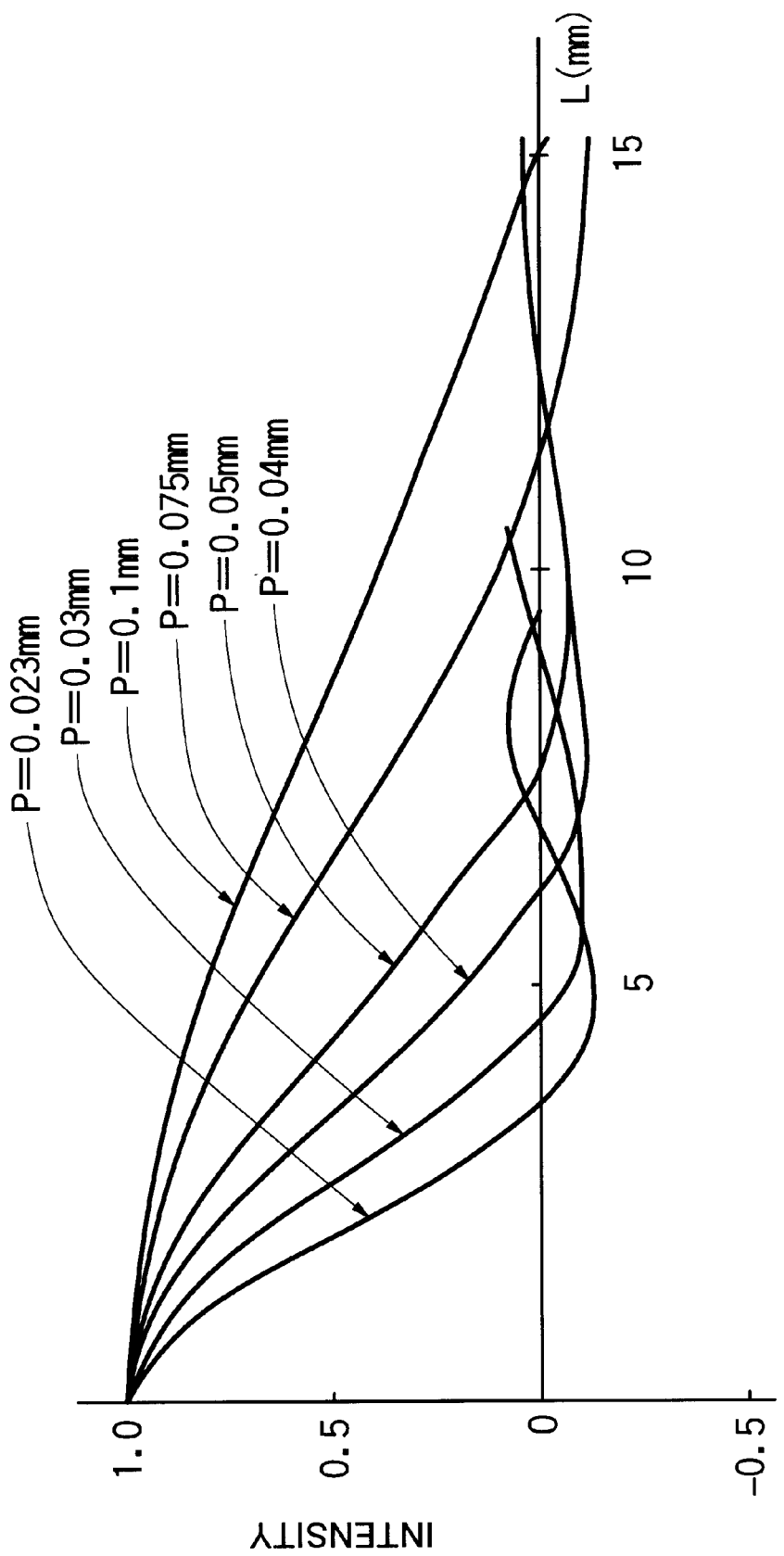
FIG. 7 is a chart showing the relationships of a gap between an image forming surface in the system for enlargedly observing an image shown in FIG. 1 and the intensity of moiré interference fringes as a pitch of an optical element of the lens being a parameter thereof.

FIG. 7 is a chart (hereinafter, it refers to a graph) showing the relationships of a distance, that is, the gap L between the image screen 1 and the lens 3 shown in FIG. 1 and the intensity of Moiré interference fringes with the pitch p as a parameter. The graph of FIG. 7 is obtained under the conditions of a=2 mm, d=500 mm, p=0.03~0.1 mm, and L=3~10 mm. The followings are apparent from the FIG. 7. That is, the gap between the screen and the filter may be set equal to or less than 3mm when the pitch of the enlarging function element added to the filter is equal to or less than 0.023 mm. The gap between the screen and the filter may be set equal to or less than 4 mm when the pitch of the enlarging function element added to the filter is equal to or less than 0.03 mm. The gap between the screen and the filter may be set equal to or less than 5 mm when the pitch of the enlarging function element added to the filter is equal to or less than 0.04 mm. The gap between the screen and the filter may be set equal to or less than 7 mm when the pitch of the enlarging function element added to the filter is equal to or less than 0.05 mm. Then, the gap between the screen and the filter may be set equal to or less than 10 mm when the pitch of the enlarging function element added to the filter is equal to or less than 0.075 mm.

Herein, the result shown in FIG. 8 can be obtained when implementing a calculation of the intensity of Moiré interference fringes based on the equation (4), with a=2 mm, d=500 mm, as the gap L and the pitch p to be the variables, which partially differ from the ones shown in the Table 1.

Figure 9:
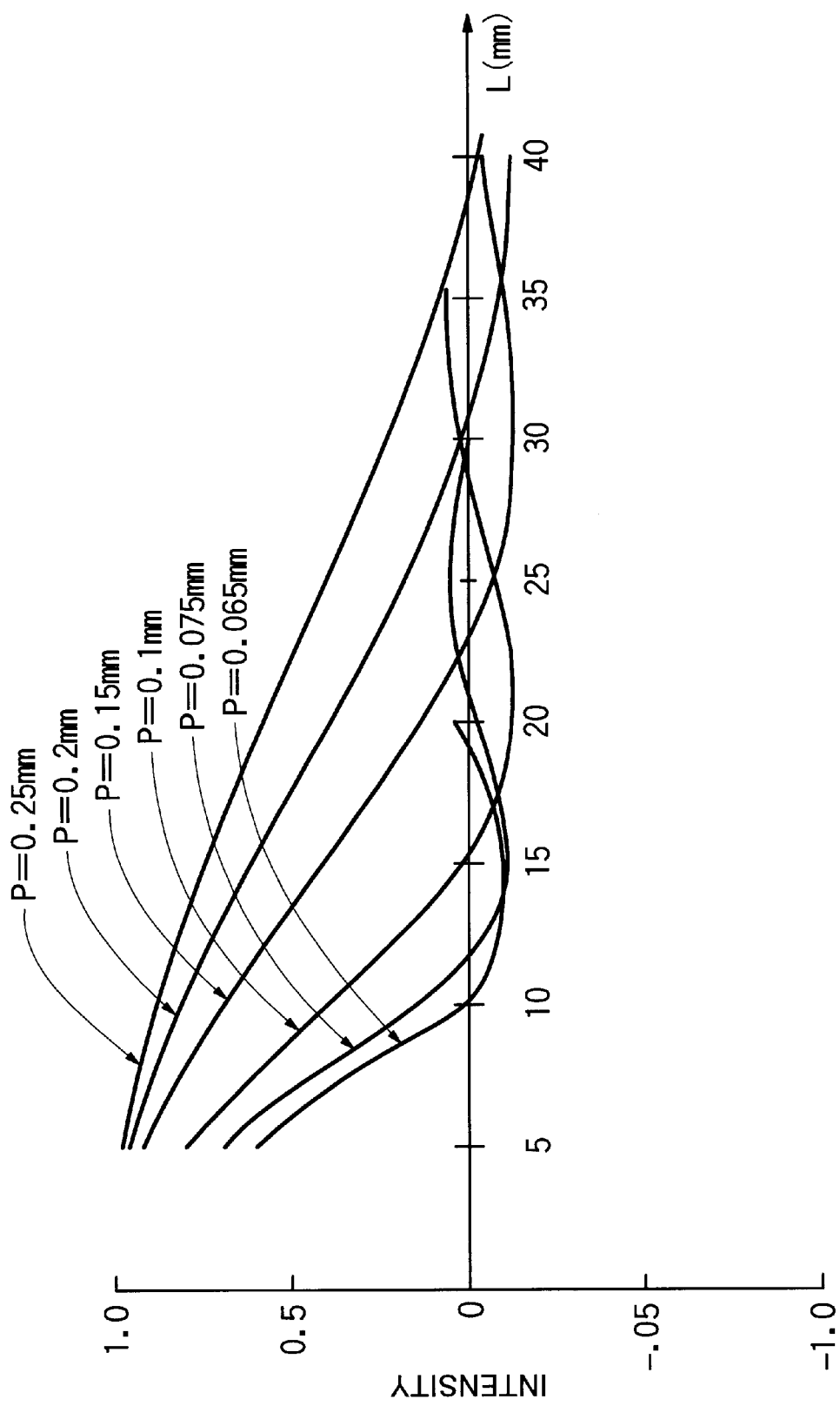
FIG. 9 is another chart showing the relationships of a gap between an image forming surface in the system for enlargedly observing an image shown in FIG. 1 and the intensity of Moiré interference fringes as a pitch of an optical element of the lens being a parameter thereof.

FIG. 9 is, as similar to FIG. 7, a chart showing the relationships of a distance, that is, the gap L between the image screen 1 and the lens 3 shown in FIG. 1 and the intensity of moiré interference fringes with the pitch p of the image enlarging optical element of the lens 3 as a parameter.

Since the intensity of Moiré interference fringes substantially not effecting on the image observation is considered to be equal to or less than 0.15 in an absolute value, it is apparent that the gap L is 35 mm~40 mm for the pitch p of the range 0.065 mm~0.25 mm, and the gap L is 30 mm~40 mm for the pitch p of the range 0.065 mm~0.20 mm, by obtaining the relationships of the gap L and the pitch p of which the intensity of Moiré interference fringes is contained within an acceptable range, from the values shown in the Table 1. The gap L is 20 mm~40 mm for the pitch p of the range 0.065 mm~0.15 mm, and the gap L is 15 mm~40 mm for the pitch p of the range 0.065 mm~0.10 mm. Further, as can be seen from the Table 1, the acceptable range of the gap L can be extended and thus reduced to 10 mm for the pitch p of the range 0.065 mm~0.075 mm.

As can be seen from FIGS. 7 and 9, it has a tendency that the intensity of Moiré interference fringes increases as the pitch p of the optical element of the lens enlarges when the gap L is constant.

Figure 15:
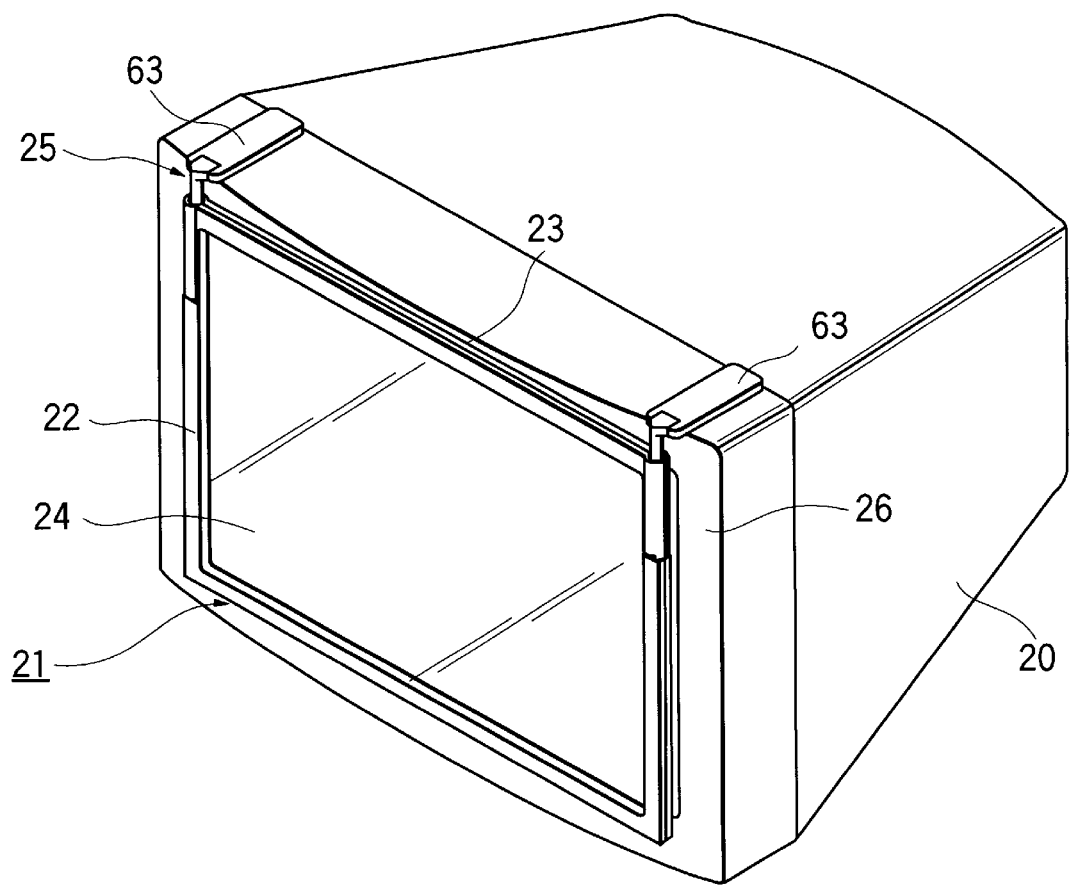
FIG. 15 is a perspective view showing a configuration of a third embodiment of the filter assembly according to the present invention.

A visual recognition can be enhanced, and a fatigue of the eyes caused by a extensive use thereof can be eased by placing the filter having the enlarging function elements configured with the thin lenses shown in FIG. 15 in front of the plane-type screen of the display.

In this case, since the screen to be seen and the filter are close, it is necessary to suppress a pitch of the minute elements that accomplish the enlarging function, to be equal to or less than a resolution (or a resolving power) of an eye. More concretely, it is necessary to suppress the pitch to be equal to or less than an approximately 0.1 mm, for one minute of the resolution of the eye, and 350 mm of an observation distance.

Figure 10:
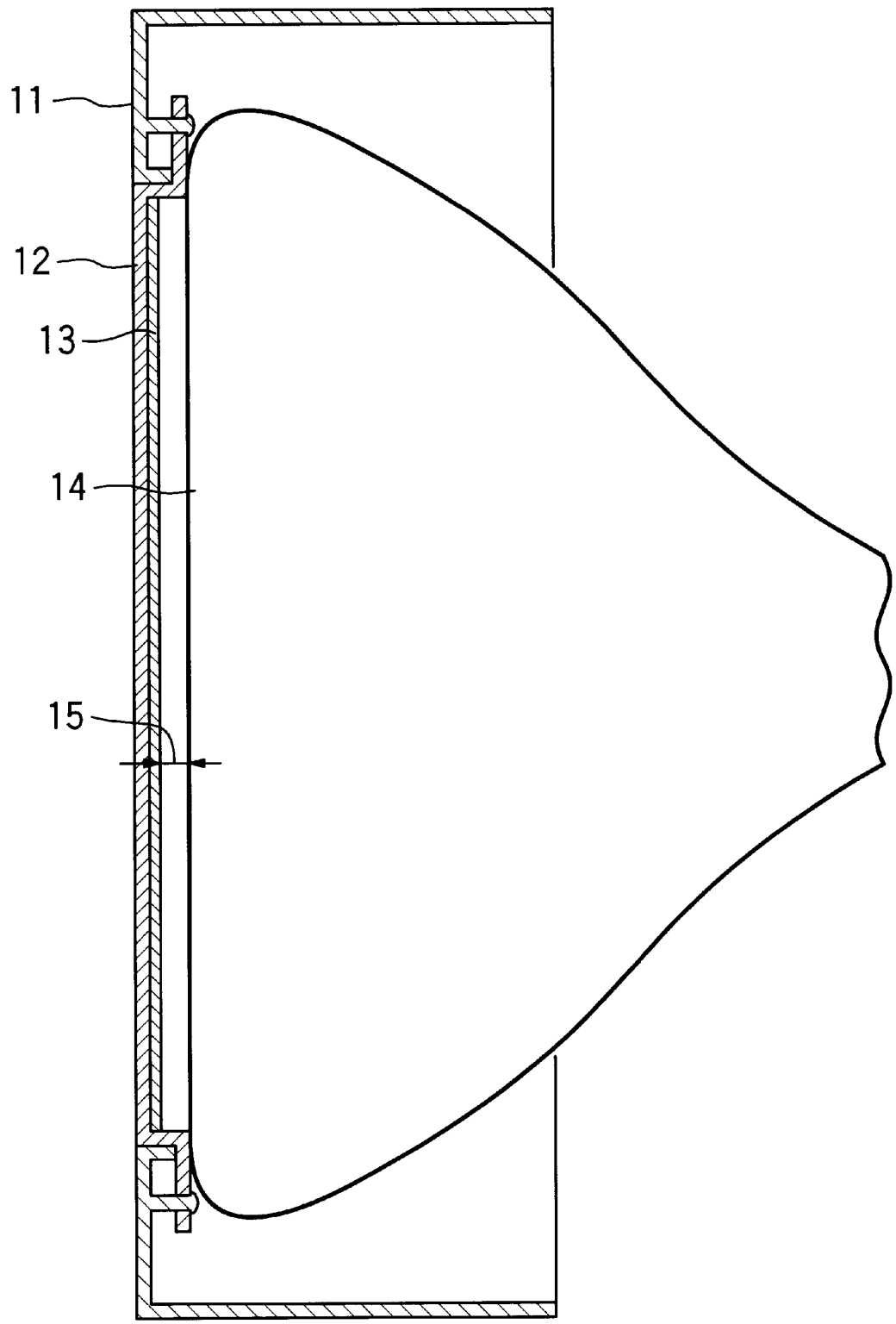
FIG. 10 is a schematic sectional diagram showing a configuration of a first embodiment of the filter assembly according to the present invention.

FIG. 10 is a schematic sectional diagram showing a configuration of the first embodiment of the filter assembly according to the present invention. The filter assembly shown in figure is configured in such that the conventional filter 12 injected in advance with the Fresnel lens 13 having an enlarging function is attached to the display body 11, and the gap 15 between the Fresnel lens surface and the CRT 14 is set to 3~10 mm, and FIG. 10 shows a section in the state of the display body 11 being mounted on the CRT 14.

Figure 11:
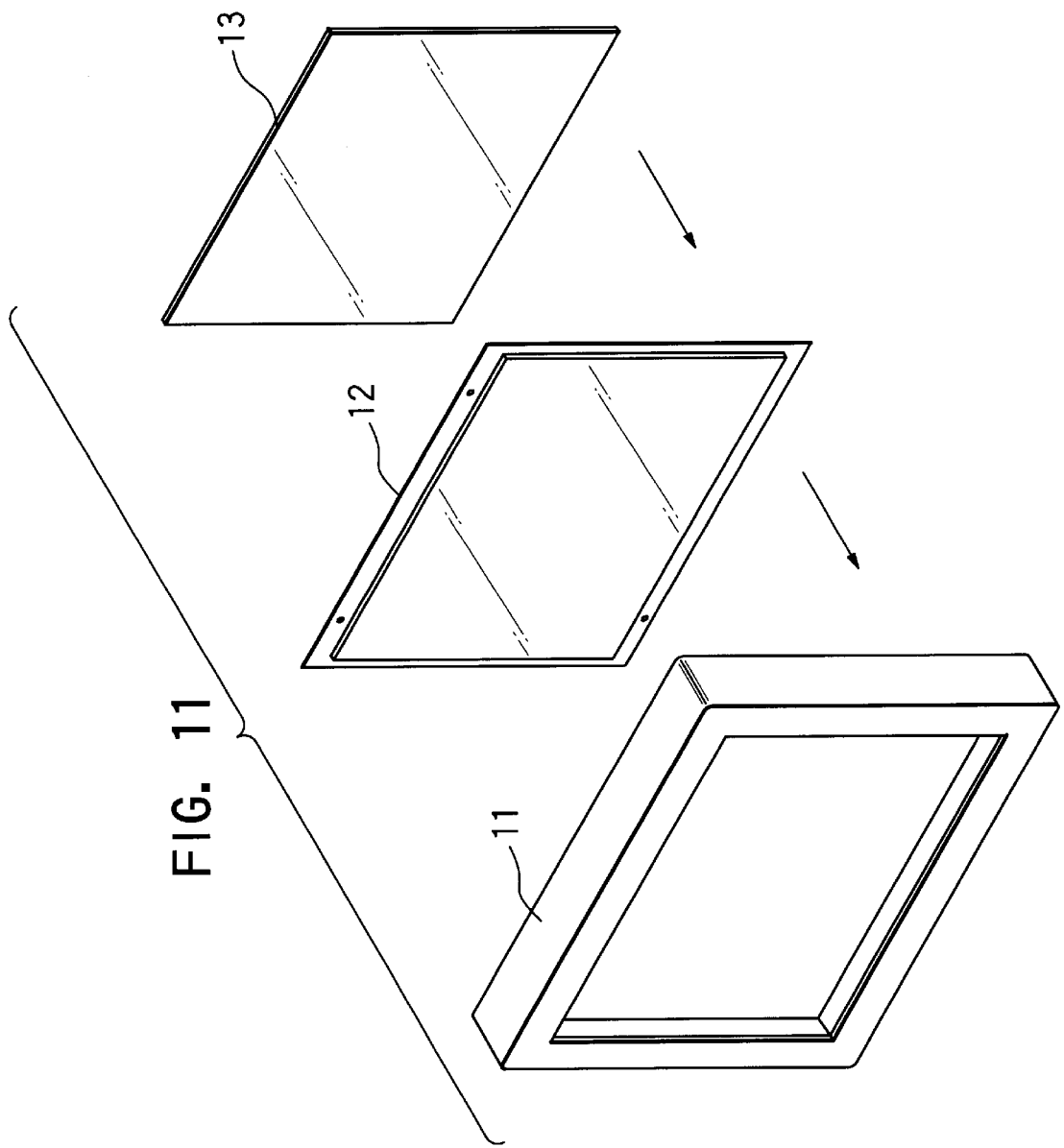
FIG. 11 is an illustrative diagram showing schematically the steps of assembling the filter assembly shown in FIG. 10.
Figure 12:
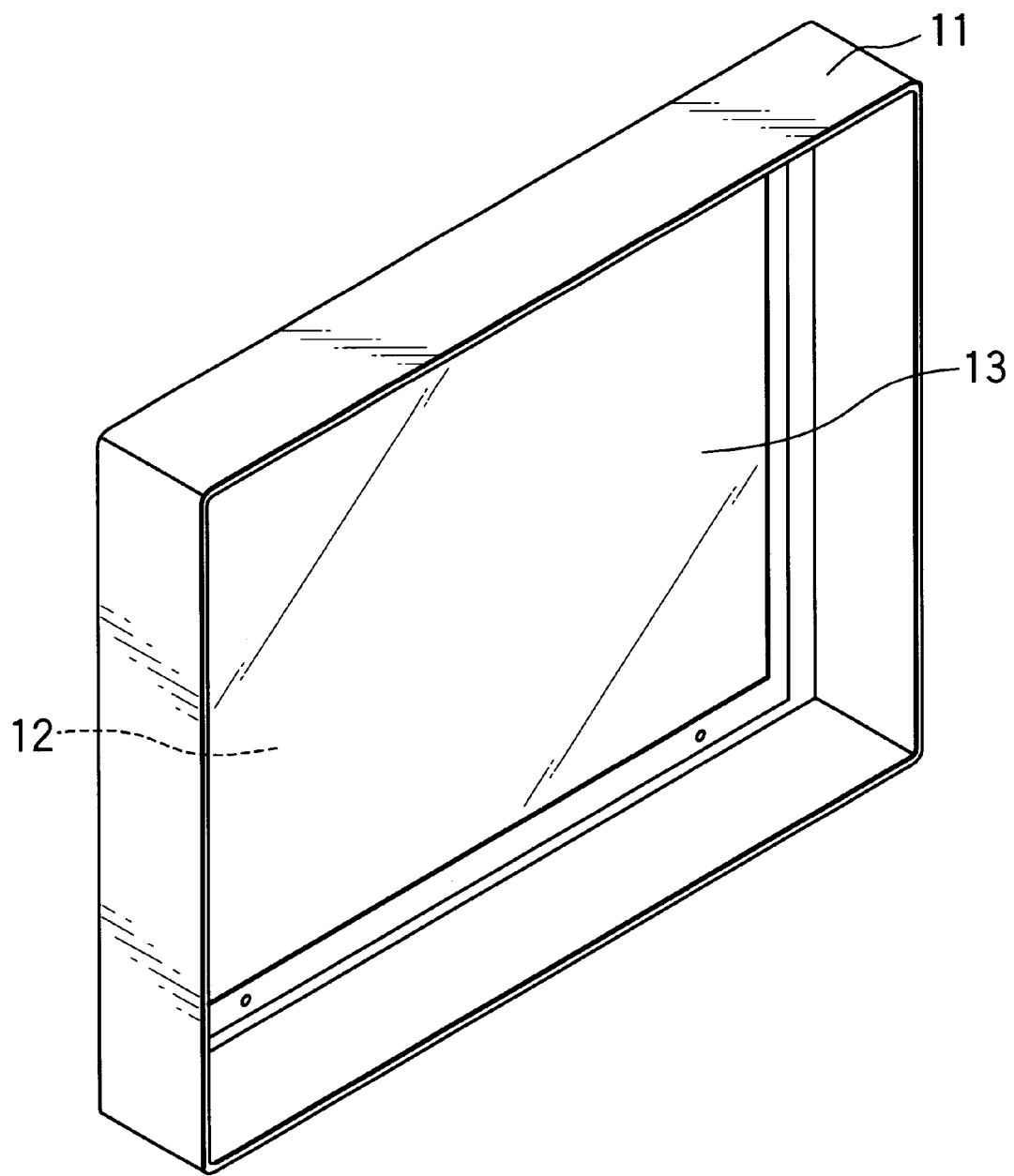
FIG. 12 is a perspective view of the filter assembly shown in FIG. 10.

FIG. 11 is a schematic diagram showing the portions of the configuration in FIG. 10 by disassembling them, and shows the display body 11, the filter 12, and the Fresnel lens 13 injected into the filter 12, respectively. Further, FIG. 12 shows the display body 11 into which the filter 12 and the Fresnel lens 13 shown in FIG. 11 are incorporated.

Figure 13:
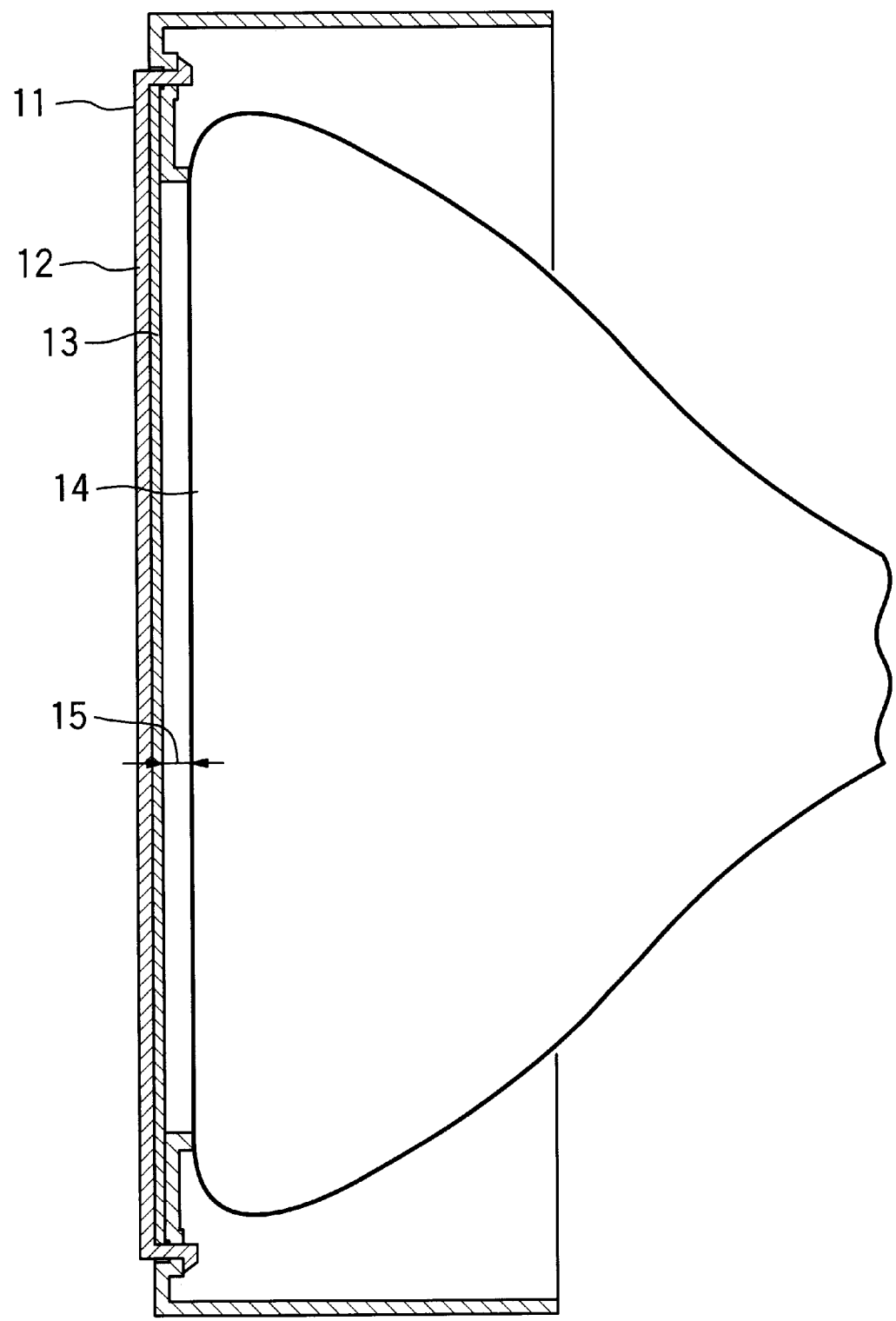
FIG. 13 is a schematic sectional diagram showing a configuration of a second embodiment of the filter assembly according to the present invention.

FIG. 13 is a schematic sectional diagram showing a configuration of the second embodiment of the filter assembly according to the present invention. The filter assembly shown in figure is, similarly to FIG. 10, configured in such that the conventional filter 12 injected in advance with the Fresnel lens 13 having an enlarging function is engaged from the front of the display body 11, and the gap 15 between the Fresnel lens surface and the CRT 14 is set to 3~10 mm, and FIG. 13 shows a section in the state of the display body 11 being mounted on the CRT 14.

Figure 14:
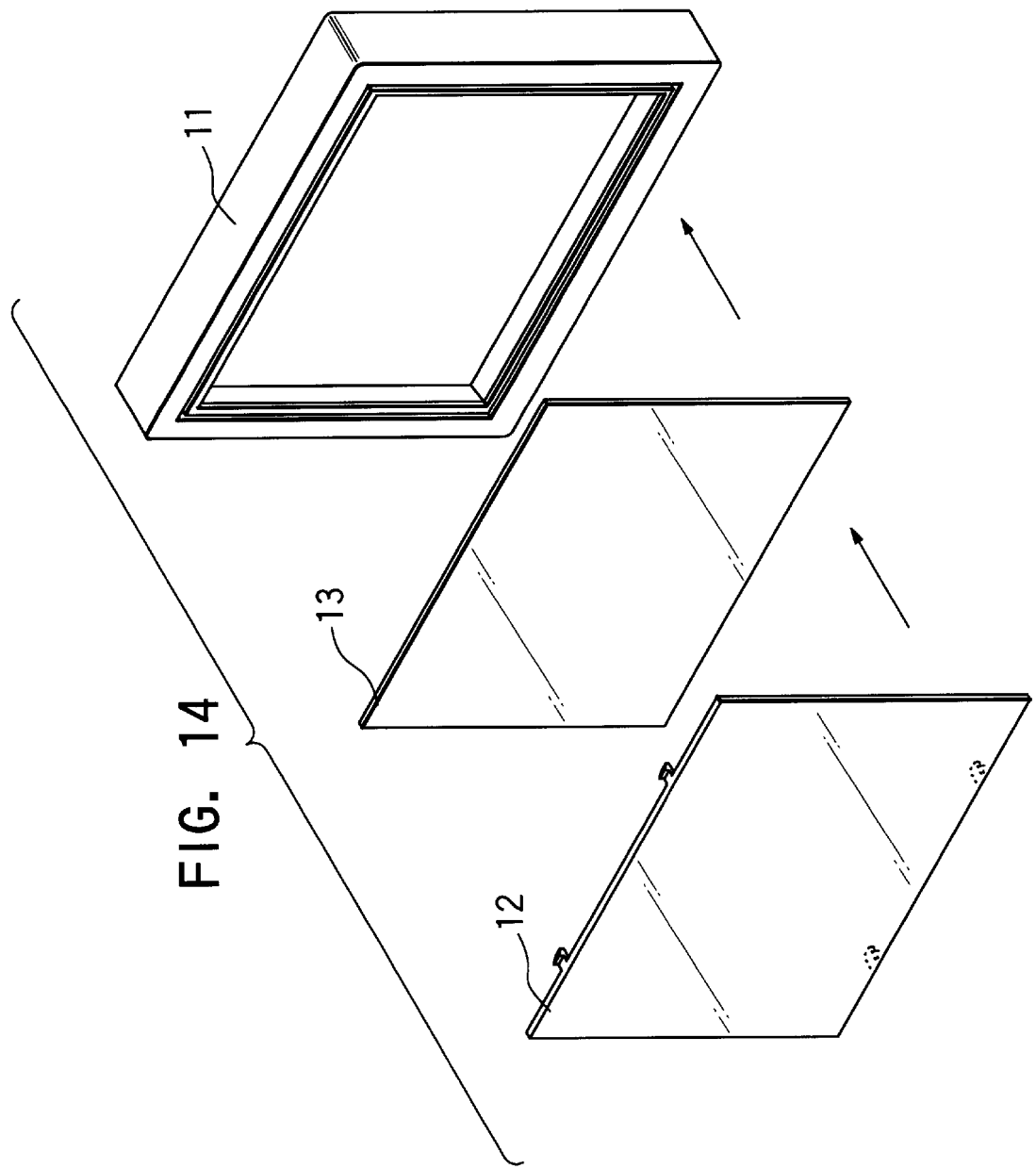
FIG. 14 is an illustrative diagram showing schematically the steps of assembling the filter assembly shown in FIG. 13.

FIG. 14 is a schematic diagram showing the portions of the configuration in FIG. 13 by disassembling them, and shows the filter 12, the Fresnel lens 13 injected into the filter 12, and the display body 11, respectively.

It is preferable to use a methyl methacrylate (PMMA), a polycarbonate (P.C.) as a material for the filter and the Fresnel described above.

Figure 16:
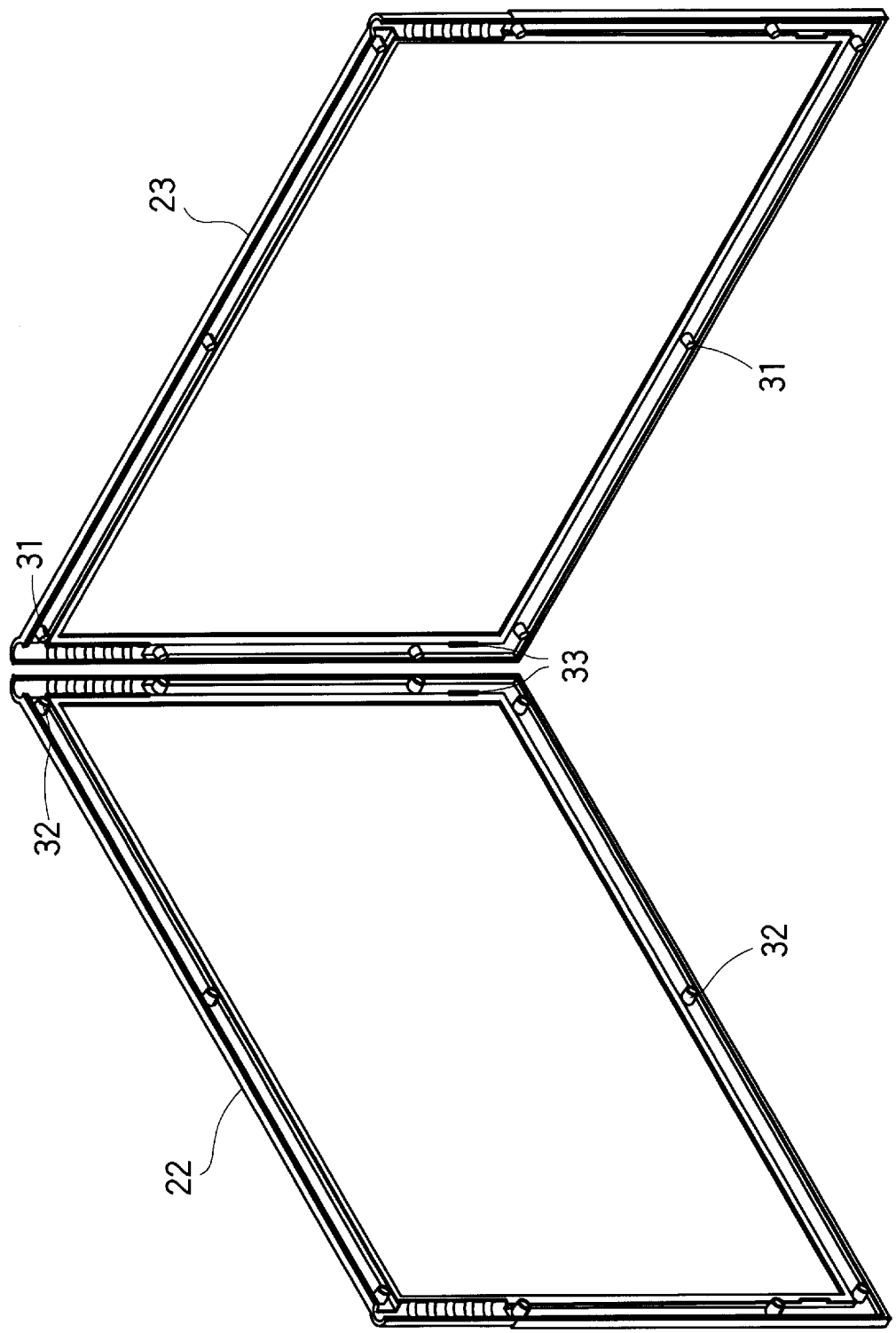
FIG. 16 is a diagram showing a front frame and a rear frame before engaging so as to form a frame structure of the filter assembly shown in FIG. 15.

FIG. 15 is a schematic diagram showing a configuration of the third embodiment of the filter assembly according to the present invention, and shows the filter assembly 21 that can be latched on the display device 20 having, for example, a cathode ray tube (CRT). The filter assembly 21 is constituted of the front frame 22, the rear frame 23, the filter 24 and the latches 25. The front frame 22 and the rear frame 23 are engaged each other and sandwich the filter 24 between them, and further forms a frame structure having a pair of the hole portions. A position of the filer 24 of the filter assembly 21 can be adjusted in a direction perpendicular to the display device 20 by inserting the latches 25 into the pair of hole portions formed in the frame structure. The latches 25 include the latch members 63, and a distance between the filter 24 and the image screen of the display device 21 can be adjusted by fixing the latch members 63 at predetermined positions of a cabinet of the display device 20. The fixing means may be, for example, the one that uses an attachable/ detachable surface-adhesive fastener. It is essential that the distance between the filter 24 and the image screen of the display device 20 can be properly adjusted in order to obtain a desirable magnification of an enlargement (a desirable magnifying power), by reducing the intensity of Moiré interference fringes. Describing it in more detail, the front frame 22 and the rear frame 23 form a frame structure by engaging the protruded part 31 on the rear frame 23 shown FIG. 16 with the hollow cylindrical protruded part 32 on the front frame 22. The filter 24 is sandwiched with the front frame 22 and the rear frame 23, and a movement thereof in the vertical direction is suppressed by the hollow cylindrical protruded part 32, and a movement thereof in the horizontal direction is suppressed and fixed by the rib 33. The filter 24 may be any type, but it is preferable to use the filter or the Fresnel lens having the configurations as illustrated in the first and the second embodiments described above if a screen enlargement is desirable.

The Fresnel lens enhances a resolving power of a display by the CRT, and serves to see the screen much clearly by a diffusion effect. The Fresnel lens is a thin lens formed with a multiple of circular belt-shaped prisms, and can be formed by a methyl methacrylate. A diffraction image that is generated in a display by the CRT can be eliminated by appropriately defining the gap between the Fresnel lens and the CRT display screen, and the pitch of the Fresnel lens' peaks. The CRT display has a convex shape for a vacuum pressure resistant, and generally the four corners situated in the diagonal directions of the CRT display are more dented than the center of the display. Therefore, the gap between the Fresnel lens and the CRT display screen at the center of the display differs from the ones at the four corners thereof, and as a result an appearance magnifying power of the image at the center of the Fresnel lens differs from the ones at the four corners of the Fresnel lens, thereby making a visual recognition much worse. As a common Fresnel lens, by making a vertical angle of the prism larger in a direction away from the center thereof, the gapes between the display screen and the Fresnel lens become larger at the four corners of the display screen, thereby an easy-to-see screen can not be obtained. Also, when the vertical angle of the prism becomes too large, a surface reflection increases, thereby an easy-to-see screen can not be obtained, similarly. It has a structure such that the vertical angle of the prism of the Fresnel lens in the present embodiment becomes a maximum on a circle of which a diameter is a long side of an opening, and the vertical angle of the prism in the range beyond that circle becomes less than the maximum vertical angle. With this structure, a visual recognition of the CRT screen can be enhanced.

Figure 17:
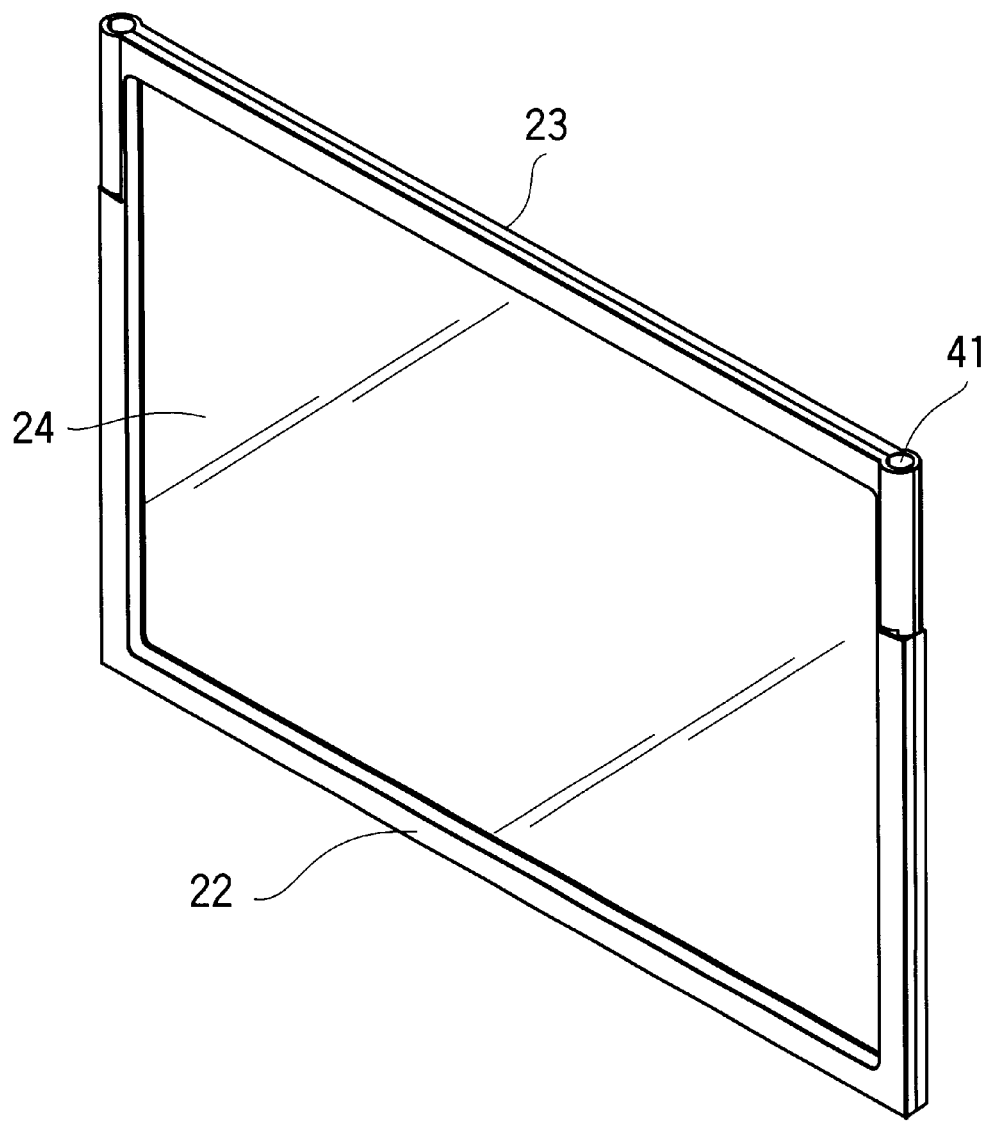
FIG. 17 is a diagram showing a frame structure formed by sandwiching a filter between the front frame and the rear frame shown in FIG. 16, and by engaging the front frame and the rear frame.

FIG. 17 shows a state of which the front frame 22 and the rear frame 23 sandwich the filter 24. With forming a frame structure by engaging the protruded part 31 of the rear frame 23 with the hollow cylindrical protruded part 32 of the front frame 22, a pair of hole parts 41 for insertion use to insert the latches 25 are formed. In this figure two hole parts 41 for insertion use are formed at the both ends in the horizontal direction, but they may be formed in other locations, and when the filter assembly 21 is latched in front of the display 26, only one hole part 41 for insertion use may be used if it is stable.

Figure 18:
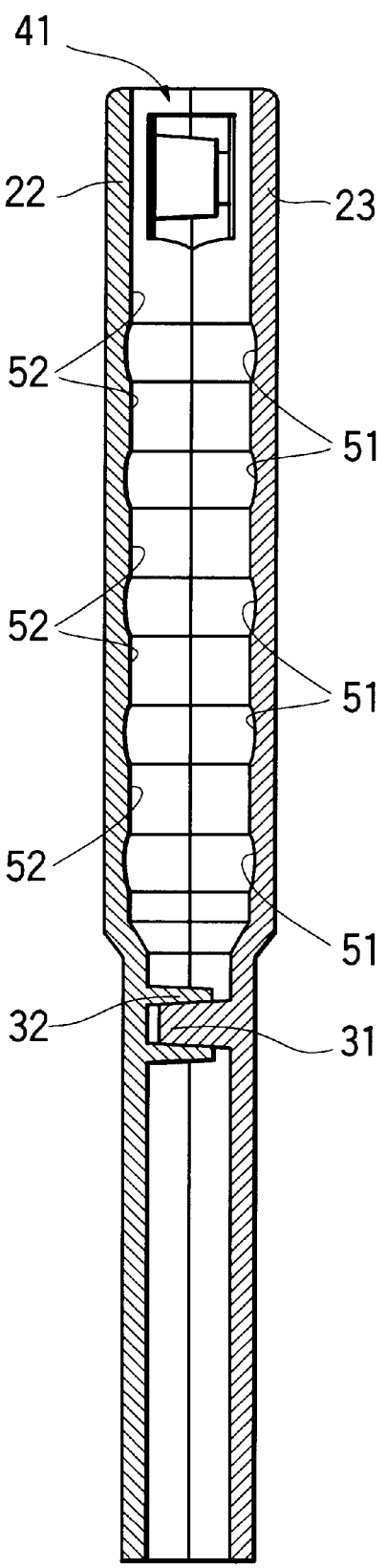
FIG. 18 is a diagram showing a section of the hole parts in the frame structure into which latches shown in FIG. 16 are inserted.
Figure 19:
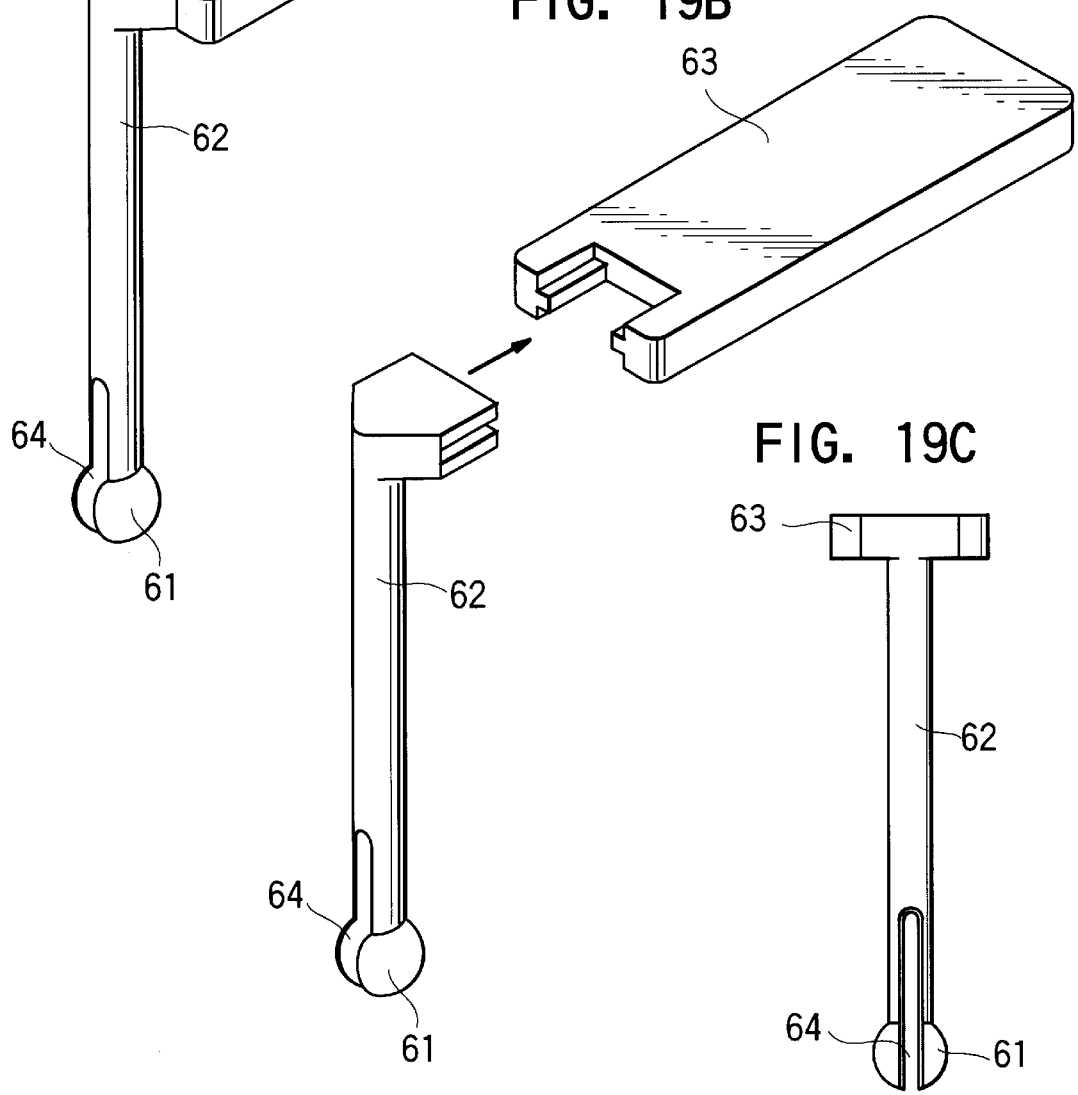
FIG. 19 is a diagram constituted of (A) a perspective view of the latches in the filter assembly shown in FIG. 15, (B) a front view of the latches, and (C) an exploded view of the latches.

FIG. 18 shows a section in a longitudinal direction of a concrete example of the hole parts 41 for insertion use. It shows a state of which a frame structure is formed by engaging the protruded part 31 of the rear frame 23 with the hollow cylindrical protruded part 32 of the front frame 22. The front frame 22 and the rear frame 23 are formed with a plastics material so as to be the structure shown in the figure. An inside of the hole part 41 for insertion use is constituted of at least one spherical-shaped bulge part 51, and at least one minor diameter cylindrical-shaped part 52 having a smaller diameter than the spherical-shaped bulge part 51. As will be described later, a member 61 for lock use of the shaft part 62 of the latch 25 to be inserted into the hole part 41 for insertion use (see FIG. 19) is fixed with the spherical-shaped bulge part 51. For enabling a fine adjustment of a position in a vertical direction, it is desirable that there exist a multiple of spherical-shaped bulge parts 51 within the hole parts 41 for insertion use.

FIG. 19A is an overall view of the latch 25, and in this figure the spherical part 61 that is a member for stop use is provided at the tip of the shaft part 62. The latch member 63 for placing the frame structure in front of the display device 20 is attached at the other end of the shaft part 62. A diameter of the spherical part 61 is larger than a sectional inner diameter of the shaft part 62. Comparing with an inner diameter of the hole part 41 for insertion use (see FIG. 18), it is desirable that the diameter of the spherical part 61 is larger than the diameter of the minor diameter cylindrical-shaped part 52, and is approximately equal to the maximum diameter of the spherical-shaped bulge part 51. It is desirable that the sectional inner diameter of the shaft part 62 is smaller than the inner diameter of the spherical-shaped bulge part 51 as well as the inner diameter of the minor diameter cylindrical-shaped part 52. When the shaft part 62 and the spherical part 61 of the latch 25 are inserted into the hole parts 41 for insertion use, the spherical part is required to possess an elasticity in order that the spherical part 61 is to be stopped at the spherical-shaped bulge part 51, through the minor diameter cylindrical-shaped part 52 of the hole parts 41 for insertion use. That is, it is necessary that the spherical part 61 squeezes the diameter thereof when passing through the minor diameter cylindrical-shaped part 52 having a smaller diameter than the spherical part 61, and returns the diameter to its original shape so as to stop at the spherical-shaped bulge part 51 when arriving at the spherical-shaped bulge part 51. For that reason, as shown in FIG. 19B, the latch 25 has a structure of which the slit 64 is formed in the axial direction from the lower part of the spherical part 61 to a predetermined location of the shaft part 62, and as a result, the spherical part 61 can elastically reduce the diameter thereof inwardly in the radial direction. When engaging with the spherical-shaped bulge 51 by passing through the minor cylindrical-shaped part 52, the spherical part 61 having that structure eventually possesses the diameter larger than the inner diameter of the minor diameter cylindrical-shaped part 52 since it makes to return the diameter thereof from the reduced state to the original state (i.e., the original size of the diameter) by a restoration force, thus the spherical part 61 is to be fixed at the spherical-shaped bulge part 51 until the load that is equal to or more than a predetermined load in the axial direction is added to the latch 25. A relative height of the filter assembly with respect to the image screen is determined by a spherical-shaped bulge part 51 with which the spherical part 61 is engaged, and an adjustment of a position in a height direction (vertical direction) with respect to the display device is made possible by selecting a proper spherical-shaped bulge part 51. An adjustment of a position in a horizontal direction with respect to the display device is made possible by relatively adjusting the position of the latching member 63 of the latch 25 to right and left. By these adjustments of the position, an optical center of the filter can be placed approximately at the center of the screen, thereby, for example, the required performance of the Fresnel lens may be demonstrated. The shaft part 62 and the latching member 63 of the latch 15 may be formed as a unified one, but it may be also formed by assembling the shaft part 62 and the latching member 63 which are separate parts, as shown in FIG. 19B.

Figure 20:
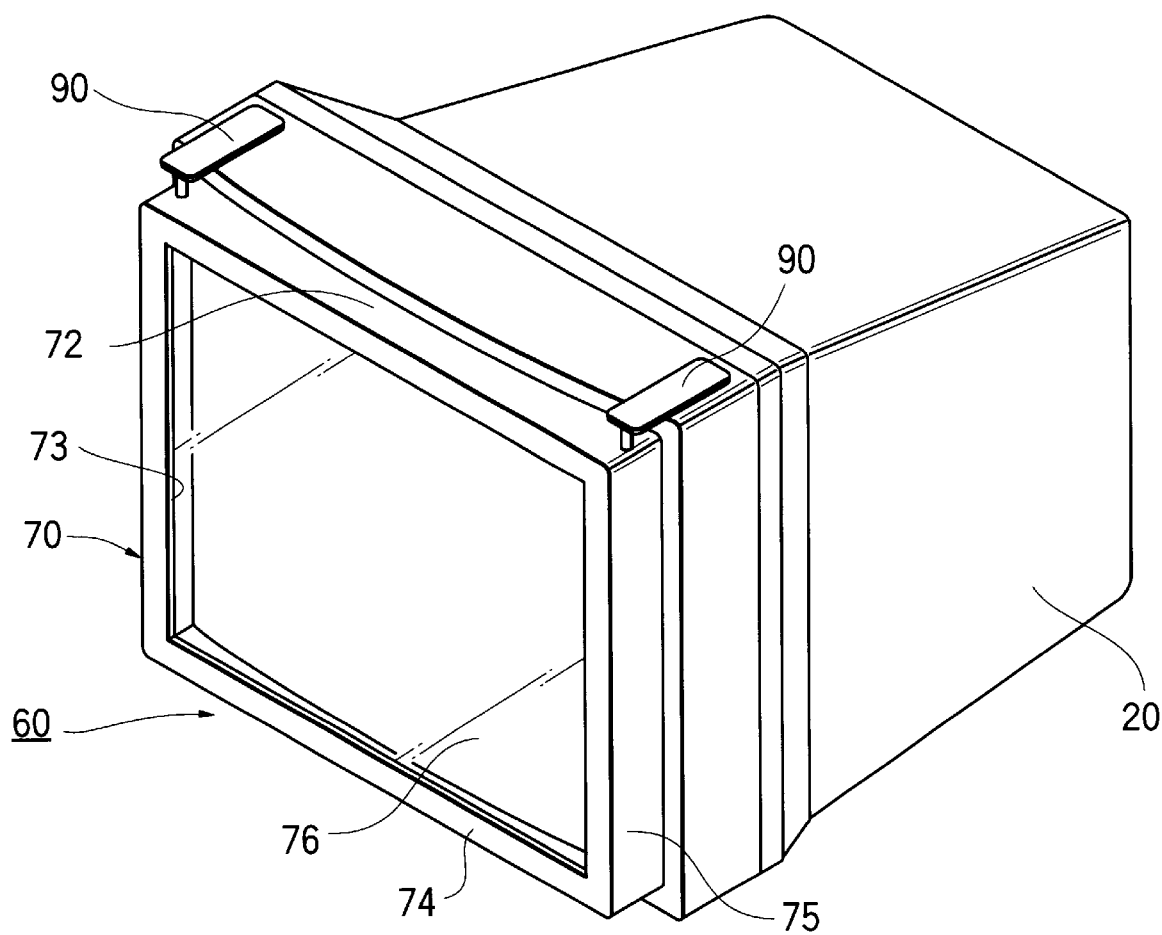
FIG. 20 is a perspective view of a configuration of the fourth embodiment of the filter assembly according to the present invention.

FIG. 20 shows a fourth embodiment of the present invention, that is the filter assembly 60 adapted to be latched on the display device 20. The filter assembly 60 is constituted of the frame structure 70, the filter 76 eand a pair of the latches 90. The rear of the frame structure 70 contacts with the cabinet of the display device 20, and determines a location of the filter 76 with respect to the image screen of the display device 20. However, as similar to the first embodiment, it is obvious that this alignment may be implemented by adjusting a position of the latching member of the latch 90. The frame structure 70 is constituted of the front board 71 having a window for the filter 76 use, the upper frame member 72, the left frame member 73, the lower frame member 74 and the right frame member 75, each of which is coupled to four outer edges of the front board 71, respectively. In this embodiment, the front board 71, the upper frame member 72, the left frame member 73, the lower frame member 74 and the right frame member 75 are unifiedly formed by a plastics material as a frame.

Figure 21:
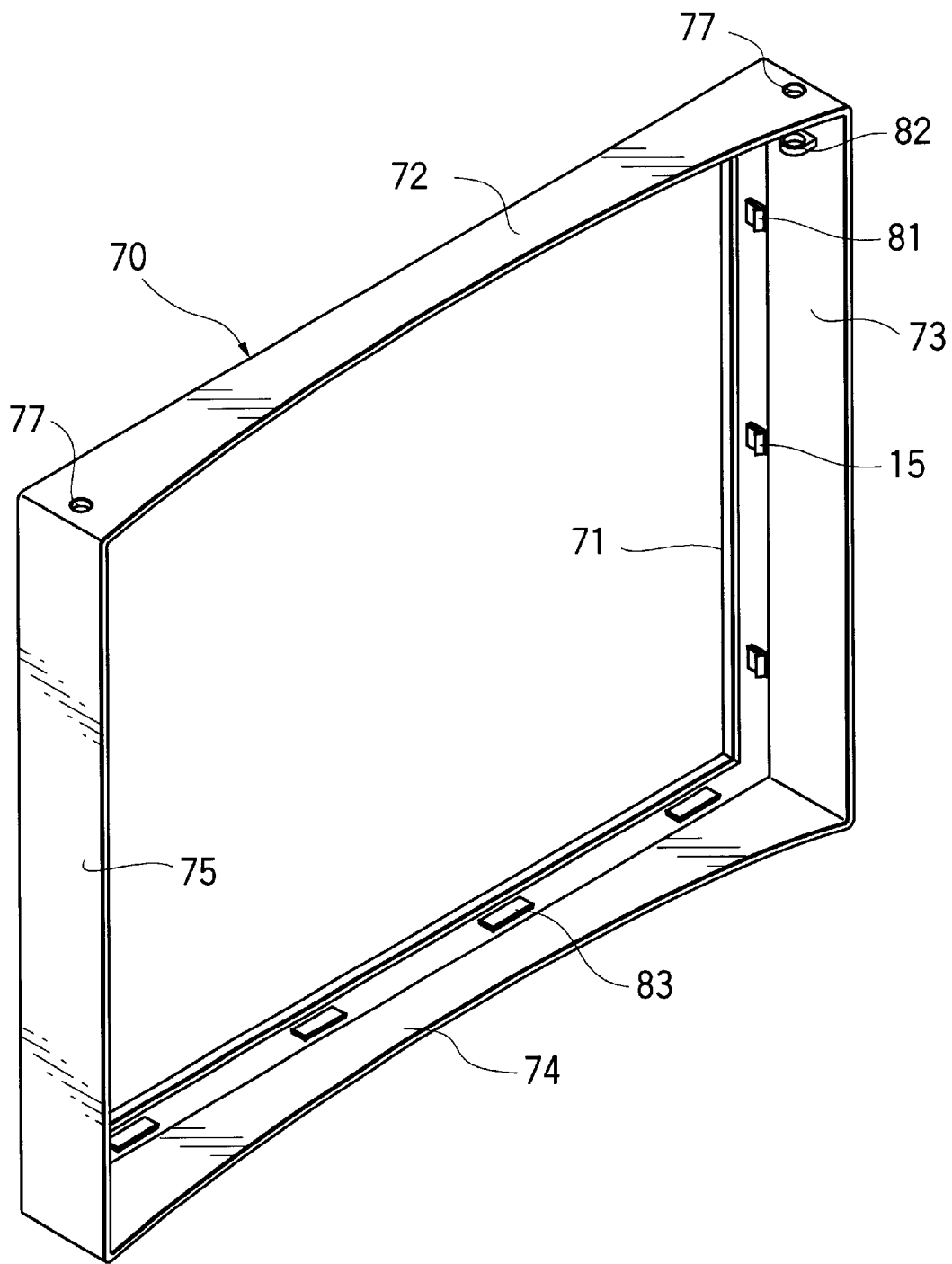
FIG. 21 is a perspective view showing the frame structure, from a backside thereof, according to the fourth embodiment of the present invention.
Figure 22A:
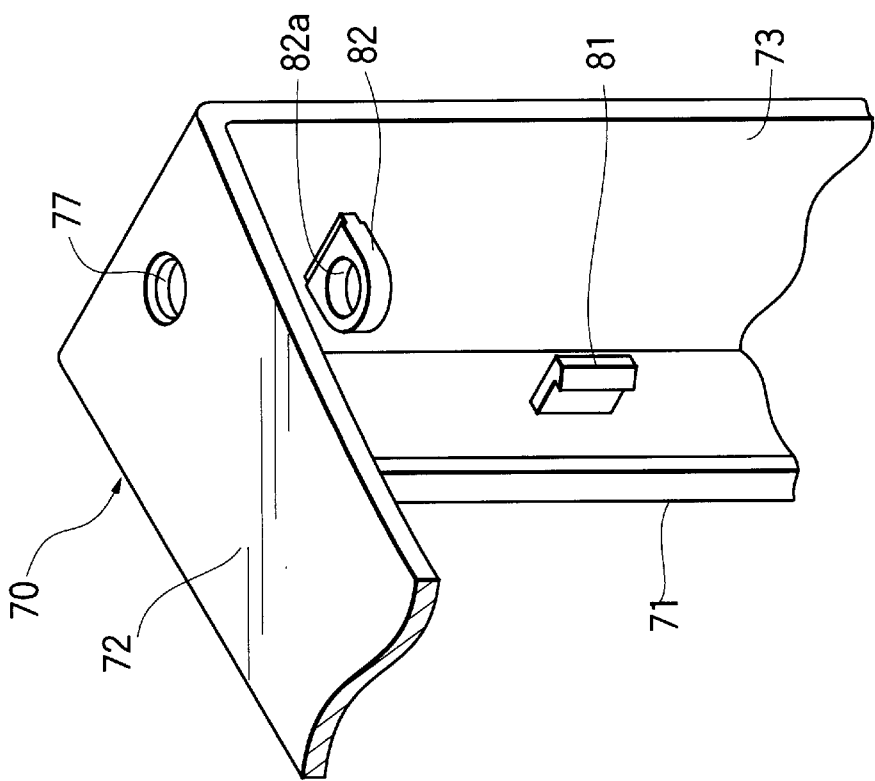
FIG. 22 is a diagram constituted of (A) a perspective diagram showing the upper corners of the frame structure from the backside thereof, (B) a horizontal sectional view showing the left part of the frame, and (C) is a sectional view showing the lower part of the frame.
Figure 22B:
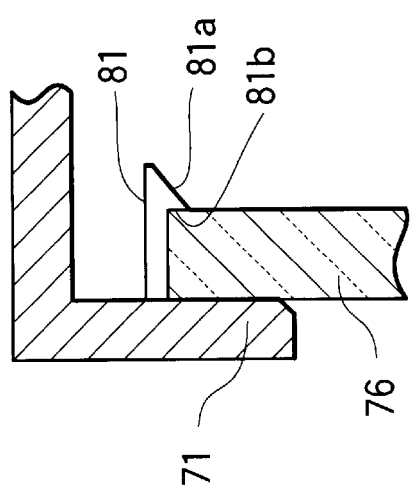
Figure 22C:
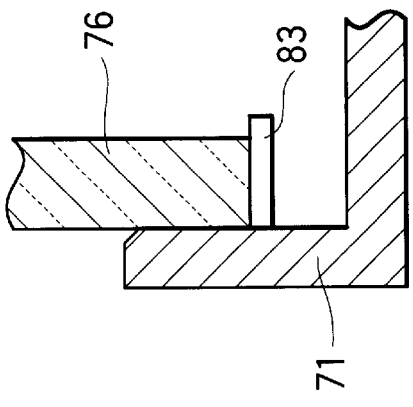

FIG. 21 shows a rear of the frame structure 70. The rear of the structure 70, that is, the edge parts in the longitudinal direction of the upper frame member 72, the left frame member 73, the lower frame member 74 and the right frame member 75 have preferably the shapes that is enabled to locate by engaging with the front of the cabinet of the display device 20. A holding claw 81 for use in fixing filter is provided inside of the frame structure 70, and a movement of the filter 76 in a horizontal direction is suppressed by engaging the filter 76 between the rear of the front board 71 and the holding claw 81. The detailed structure thereof is shown in FIG. 22B. In the rear of the front boards 71 on both sides, a plurality of holding claws 81 are provided to protrude toward the rear. The holding claw 81 has slope 81a at a free end thereof, and an engagement stop surface 81b is formed inside of the slope 81a. Accordingly, when pushing the filter 76 from the rear of the frame structure 70 with facing the front, the filter hits the slope 81a of the holding claw 81, thereby elastically bending the holding claws outwardly in a horizontal direction. As a result, the filter 76 may be pushed to, beyond the engagement stop claw 81b of the holding claw 81, the rear of the front board 71 within the frame structure 70. When the filter 76 is pushed beyond the engagement stop claw 81b within the frame structure 76, the holding claw 81 returns to its original state by an elasticity thereof, and in a state that the front of the filter 76 contacts with the rear of the front board 71, the engagement stop claw 81b engages with the filter 76. The filter pad 83 shown in FIGS. 21 and 22C is formed to protrude from the rear of the front board 71 above the lower frame member 74, and suppresses a downward movement of the filter 76. Accordingly, the filter 76 is properly located within the frame structure 70 as the rear of the front board 71, the engagement stop claw 81 and the filter pad 83 being functioned. Further, as shown in detail in FIG. 22A, in the side board 73 (and 75), an aperture 82a formed in the supporting bracket 82 that receives the latch 90 is provided in concentric with the hole 77 for insertion use.

Figure 23:
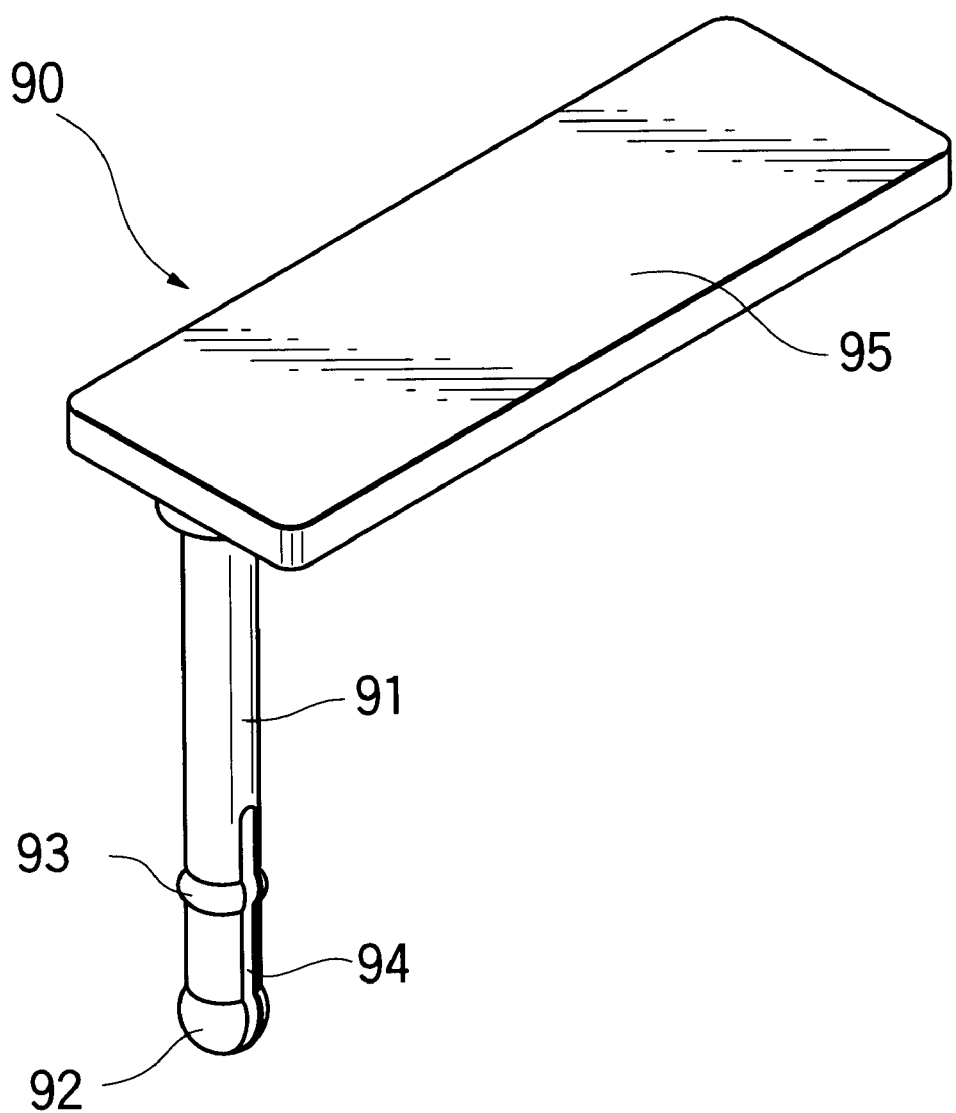
FIG. 23 is a perspective diagram showing the latches according to the fourth embodiment of the present invention.

As shown in FIG. 23, the latch 90 includes a shaft part 91, a latching member 94 formed at one end of the shaft part 91 and required for latching the frame structure 70 on the display device 10, and in the shaft part 91 a spherical part 92 and a ring-shaped bead 93 which are the members for use in stopping are provided, and make it possible to implement the height adjustment of the four levels in association with the hole 77 for insertion use and the aperture 82a of the support bracket 82. The spherical part 92 shown in the embodiment is formed at an open end of the shaft part 91, and possesses a spherical shape, but it may possess a ring-bead shape, for example, as far as it is a protruded shape outwardly from the shaft part in the radial direction. In the shaft part 91 a slit 94 is formed so that the shaft part can elastically squeeze its diameter inwardly in the radial direction. In order that a shaft part at a certain location of the ring-bead 93 possesses an elasticity, the ring-bead 93 has to be formed on the shaft part 91 in which the slit 94 is formed.

FIG. 24 shows a state that the latch 90 is adjusted to the four levels of height. FIG. 24A shows a state that before the shaft part 91 of the latch 90 is inserted in the frame 70, FIG. 24B shows a state that the spherical part 92 has inserted to the hole 77 for insertion use, FIG. 24C shows a state that the ring-bead 93 has inserted to the hole 77 for insertion use, FIG. 24D shows a state that the spherical part 92 has inserted to the aperture 82a, and the FIG. 24E shows a state that the ring-bead 93 has inserted to the aperture 82a. Since it is apparent that only two-levels of height can be adjusted if a gap between the spherical part 92 and the ring-bead 93 is equivalent to a gap between the hole 77 for insertion use and the aperture 82a, it is necessary to differ the above mentioned gapes in order to make it possible to implement much fine adjustment of height, i.e., the four-levels adjustment of height in this embodiment. The diameters of the spherical part 92 and the ring-bead 93 are, in an ordinary state, larger than the ones of the hole 77 for insertion use and the aperture 82a. The spherical part 92 and the ring-bead 93 squeeze the diameters thereof inwardly in the radial direction, at a time when passing through the hole 77 for insertion use and the aperture 82a, and then return the diameters to their original states by an outward elasticity in the radial direction, thereby maintaining the frame structure 70 in a predetermined position in a vertical direction.

Figure 25:
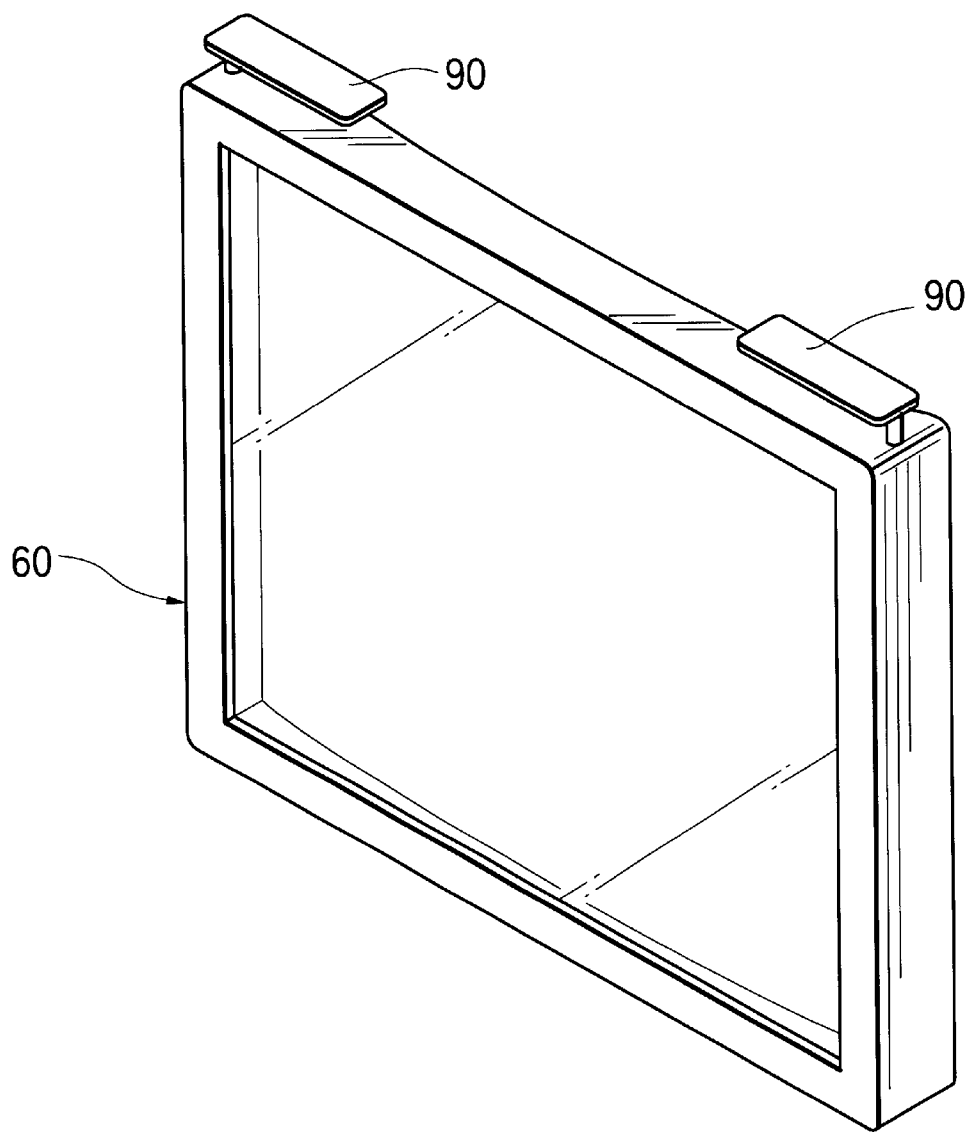
FIG. 25 is an illustrative diagram showing an easily-packed aspect of the filter assembly of which the latches are rotated.

The latch 25 shown in the third embodiment and the latch 90 shown in the fourth embodiment enable to rotate around the axes thereof, according to the configurations thereof. FIG. 25 shows a state of a filter assembly that facilitates of packing, by rotating the latch 90.

What is claimed is:

1. An image observing device for enlargedly observing an image on an image screen having a plurality of pixels arranged in a two-dimensional plane with a periodicity, said image observing device comprising:

a thin transparent lens configuration configured to enlargedly and transparently observe an image, and arranged with a plurality of image enlarging optical elements in a two-dimensional plane having a periodicity by a predetermined pitch; and a positioning structure for positioning said thin transparent lens configuration with respect to said image screen, wherein said lens configuration has an overall magnifying power in a predetermined range, and is positioned by said positioning structure on an observer side apart from said image screen with a predetermined gap, said pitch of said plurality of image enlarging optical elements formed in said lens configuration being in a predetermined range, and said predetermined gap between said lens configuration and said image screen being defined in association with said pitch of said optical elements of said lens configuration such that said gap is increased as said pitch is decreased whereby an intensity of Moire interference fringes caused by a periodicity of an arrangement of said pixels in said image screen and a periodicity of an arrangement of said optical elements of said lens configuration must not exceed a certain value.

2. An image observing device according to claim 1, wherein said intensity of Moire interference is expressed by $$S=[2J_1(2\pi aL/dp)]/[2\pi aL/dp]$$

wherein, S represents said intensity of Moire interference fringes, $J_1$ represents a first Bessel function, a represents a radius of an eye of the observing system, d represents a distance between said eye and said lens configuration, L represents said predetermined gap, and p represents said predetermined pitch.

3. An image observing device according to claim 1, wherein said predetermined range of said overall magnifying power of said lens configuration is 1.01~1.20.

4. An image observing device according to claim 1, wherein said predetermined range of said predetermined gap between said lens configuration and said image screen is 2 mm~40 mm.

5. An image observing device according to claim 4, wherein said predetermined range of said pitch of said plurality of image enlarging optical elements formed in said lens configuration is 0.023 mm~0.25 mm.

6. An image observing device according to claim 1, wherein said certain value of said intensity of Moiré interference fringes is 0.15 in an absolute value.

7. An image observing device according to claim 1, wherein said predetermined range of said predetermined gap between said lens configuration and said image screen is 35 mm~40 mm.

8. An image observing device according to claim 1, wherein said predetermined range of said predetermined gap between said lens configuration and said image screen is less than 40 mm.

9. An image observing device according to claim 8, wherein said predetermined range of said pitch of said plurality of image enlarging optical elements formed in said lens configuration is 0.065 mm~0.25 mm.

10. An image observing device according to claim 1, wherein said predetermined range of said predetermined gap between said lens configuration and said image screen is 30 mm~40 mm.

11. An image observing device according to claim 10, wherein said predetermined range of said pitch of said plurality of image enlarging optical elements formed in said lens configuration is 0.065 mm~0.20 mm.

12. An image observing device according to claim 10, wherein said predetermined range of said pitch of said plurality of image enlarging optical elements formed in said lens configuration is 0.065 mm~0.15 mm.

13. An image observing device according to claim 1, wherein said predetermined range of said predetermined gap between said lens configuration and said image screen is 20 mm~40 mm.

14. An image observing device according to claim 1, wherein said predetermined gap between said lens configuration and said image screen is in said predetermined range of 15 mm~40 mm.

15. An image observing device according to claim 14, wherein said predetermined range of said pitch of said plurality of image enlarging optical elements formed in said lens configuration is 0.065 mm~0.010 mm.

16. An image observing device according to claim 1, wherein said predetermined range of said predetermined gap between said lens configuration and said image screen is 10 mm~40 mm.

17. An image observing device according to claim 16, wherein said predetermined range of said pitch of said plurality of image enlarging optical elements formed in said lens configuration is 0.065 mm~0.075 mm.

18. An image observing device for enlargedly observing an image on an image screen having a plurality of pixels arranged in a two-dimensional plane with a periodicity, said image observing device comprising:

a thin transparent lens configuration configured to enlargedly and transparently observe an image, and arranged with a plurality of image enlarging optical elements in two-dimensions having a periodicity by a predetermined pitch on a first side on an observer side relative to said image screen and on a second side that is an opposite side of said observer side, respectively, said first side being located apart from said image screen with a predetermined gap; and a supporting structure for supporting said thin transparent lens configuration, wherein said lens configuration is such that a first plurality of image enlarging optical elements located on said first side and a second plurality of image enlarging optical elements located on said second side are arranged perpendicularly to each other with respect to a central axis which is common to both of the first and the second sides, said predetermined gap between said lens configuration and said image screen being defined in association with said pitch of said optical elements of said lens configuration such that said gap is increased as said pitch is decreased whereby an intensity of Moiré interference fringes caused by a periodicity of an arrangement of said pixels in said image screen and a periodicity of an arrangement of said optical elements of said lens configuration must not exceed a certain value.

19. An image observing device according to claim 18, wherein said intensity of Moiré interference is expressed by $$S=[2J_1(27\pi aL/dp)]/[27\pi aL/dp]$$

wherein, S represents said intensity of Moiré interference fringes, $J_1$ represents a first Bessel function, a represents a radius of an eye of the observing system, d represents a distance between said eye and said lens configuration, L represents said predetermined gap, and p represents said predetermined pitch.

20. An image observing device according to claim 18, wherein said lens configuration is configured such that a maximum prism angle θ of the minute parts in said optical elements of said lens configuration satisfies a relationships of $\theta \leq \sin^{-1}(1/n)$ with a refractive index n of a material for said optical elements.

21. An image observing device according to claim 18, wherein said predetermined gap between said lens configuration and said image screen is in the range of 2 mm~40 mm, and said pitch of said plurality of optical elements is in the range of 0.023 mm~0.25 mm.

22. An image observing device according to claim 18, wherein said predetermined gap between said lens configuration and said image screen is in the range of 2 mm~10 mm.

23. An image observing device according to claim 18, wherein said lens configuration is a Fresnel lens.

24. An image observing device according to claim 23, wherein said Fresnel lens includes multiple lens elements concentrically arranged for an optical axis, wherein said lens elements constitute optical elements for enlarging an image, and being formed on a surface of said Fresnel lens with a constant pitch.

25. An image observing device according to claim 18, wherein said lens configuration is a lenticular lens.

26. An image observing device according to claim 18, wherein said lens configuration is a lens-beads array.

27. An image observing device according to claim 18, wherein said lens configuration is a cylindrical lens.

28. An image observing device according to claim 27, wherein said cylindrical lens includes, by intersecting a generatrix of a cylindrical surface at both surfaces of a thin lens, a first group of multiple cylindrical lens elements on one surface thereof, and a second group of multiple cylindrical lens elements on the other surface thereof means, wherein said second group of multiple cylindrical lens elements being rotated at 90 degrees with respect to said first group of multiple cylindrical lens elements.

29. An image observing assembly which is configured to be placed in front of a display device having an image screen, comprising: (a) an image observing device comprising: a thin transparent lens configuration configured to enlargedly and transparently observe an image, and arranged with a plurality of image enlarging optical elements in a two-dimensional plane having a periodicity by a predetermined pitch; and an adjusting means for adjusting a distance of said thin transparent lens configuration from said image screen, wherein said lens configuration has an overall magnifying power in a predetermined range, and is placed on an observer side apart from said image screen with a predetermined gap, said predetermined gap between said lens configuration and said image screen being in a predetermined range using said adjusting means, said pitch of said plurality of image enlarging optical elements formed in said lens configuration being in a predetermined range, and said predetermined gap between said lens configuration and said image screen being defined in association with said pitch of said optical elements of said lens configuration such that said gap is increased as said pitch is decreased whereby an intensity of Moire interference fringes caused by a periodicity of an arrangement of said pixels in said image screen and a periodicity of an arrangement of said optical elements of said lens configuration must not exceed a certain value; and (b) a frame structure having an opening for looking at an image therethrough by an observer, wherein said frame structure is constituted of a front frame and a rear frame which are engaged with each other, and supports said lens configuration in said image observing device by sandwiching said lens configuration between said front frame and said rear frame, said frame structure being further constituted of a latching means having a latch and a hole part, wherein said hole part has an opening for a latch insertion at an edge surface, and wherein said latch including a shaft part and a latching member provided at one end of said shaft part and extending from said shaft part in a horizontal direction, is attached to said frame structure by inserting said shaft part into said hole part, and wherein said frame structure is attached to said display device in a state that said lens configuration is placed in front of said display device by latching said latching member of said latch on an upper surface of said display device.

30. An image observing assembly according to claim 29, further comprising:
(c) means for changing a relative height of said frame structure with respect to said display device by adjusting an insertion depth of said shaft part of said latch into said frame structure.

31. An image observing assembly according to claim 30, wherein said means for changing a relative height includes a member for use in stopping, provided at said shaft part of said latch, wherein said hole part is configured to extend downwardly from an upper edge part said frame structure, at least one part thereof having a diameter smaller than a diameter of said member for use in stopping, and being used for stopping said shaft part,
wherein said latch is adapted to suspend said frame structure by inserting said member for use in stopping into said one part, whereby enabling to adjust a relative position of said lens configuration with respect to said display.

32. An image observing assembly according to claim 31, wherein said means for changing a relative height is adapted to possess an elasticity in a direction perpendicular to an axial direction, by forming a slit from a free end of said shaft part toward said axial direction.

33. An image observing assembly according to claim 30, wherein said member for use in stopping is a ring-bead formed on said shaft part in which a slit is formed.

34. An image observing assembly according to claim 30, wherein said lens configuration is a Fresnel lens.

35. An image observing assembly according to claim 34, wherein said Fresnel lens includes multiple lens elements concentrically arranged for an optical axis,
wherein said lens elements constitute optical elements for enlarging an image, and being formed on a surface of said Fresnel lens with a constant pitch.

36. An image observing assembly according to claim 30, wherein said lens configuration is a lenticular lens.

37. An image observing assembly according to claim 30, wherein said lens configuration is a lens-beads array.

38. An image observing assembly according to claim 30, wherein said lens configuration is a cylindrical lens.

39. An image observing assembly according to claim 38, wherein said cylindrical lens includes, by intersecting a generatrix of a cylindrical surface at both surfaces of a thin lens, a first group of multiple cylindrical lens elements on one surface thereof, and a second group of multiple cylindrical lens elements on the other surface thereof means, wherein said second group of multiple cylindrical lens elements being rotated at 90 degrees with respect to said first group of multiple cylindrical lens elements.

* * * * *